United States Patent
Nakamura et al.

(10) Patent No.: US 10,715,709 B2
(45) Date of Patent: Jul. 14, 2020

(54) IMAGING DEVICE, OPTICAL DEVICE PROVIDED WITH SAME, ELECTRONIC DEVICE PROVIDED WITH SAME, AND METHOD FOR PRODUCING IMAGING DEVICE

(71) Applicant: NIDEC COPAL CORPORATION, Tokyo (JP)

(72) Inventors: Yuta Nakamura, Tokyo (JP); Ryo Kikuta, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/286,948

(22) Filed: Feb. 27, 2019

(65) Prior Publication Data
US 2019/0208094 A1    Jul. 4, 2019

Related U.S. Application Data

(63) Continuation of application No. 15/547,207, filed as application No. PCT/JP2015/077237 on Sep. 28, 2015, now Pat. No. 10,284,757.

(30) Foreign Application Priority Data

Jan. 30, 2015 (JP) ................. 2015-017346
Mar. 30, 2015 (JP) ................. 2015-070431
Jul. 27, 2015 (JP) ................. 2015-148027

(51) Int. Cl.
*H04N 5/225* (2006.01)
*G02B 7/02* (2006.01)
(Continued)

(52) U.S. Cl.
CPC .......... *H04N 5/2254* (2013.01); *G02B 7/003* (2013.01); *G02B 7/02* (2013.01); *G02B 7/04* (2013.01);
(Continued)

(58) Field of Classification Search
CPC . G02B 7/003; G02B 7/02; G02B 7/04; H04N 5/2254; H04N 5/225; H04N 5/2253; H04N 5/253
See application file for complete search history.

(56) References Cited

U.S. PATENT DOCUMENTS

2006/0146170 A1    7/2006  Saito et al.
2007/0201152 A1    8/2007  Nishikawa et al.
(Continued)

FOREIGN PATENT DOCUMENTS

CN       101419327 A       4/2009
DE    102005038941 A       4/2006
(Continued)

OTHER PUBLICATIONS

International Search Report dated Dec. 22, 2015 during the prosecution of PCT/JP2015/077237 with English translation.
(Continued)

*Primary Examiner* — Antoinette T Spinks
(74) *Attorney, Agent, or Firm* — Troutman Sanders LLP

(57) ABSTRACT

An imaging device has a lens holding member; a base member for holding the lens holding member; and a substrate to which the base member is secured. The lens holding member holds at least one lens. The base member has a contact surface that is perpendicular to an optical axis of the lens, and contacts an end face of the lens holding member in a state wherein the lens holding member is held; and an opening portion through which passes the optical axis of the lens, provided in the contact surface. The substrate has an imaging element on which light that has passed through the lens and through the opening portion of the base member is incident.

4 Claims, 25 Drawing Sheets

(51) Int. Cl.
*G02B 7/04* (2006.01)
*G03B 17/02* (2006.01)
*G02B 7/00* (2006.01)
*H04N 5/232* (2006.01)
*G03B 43/00* (2006.01)

(52) U.S. Cl.
CPC ............ *G03B 17/02* (2013.01); *H04N 5/225* (2013.01); *H04N 5/2253* (2013.01); *H04N 5/232* (2013.01); *G03B 43/00* (2013.01)

(56) References Cited

U.S. PATENT DOCUMENTS

| | | |
|---|---|---|
| 2009/0109330 A1 | 4/2009 | Nakano et al. |
| 2010/0157440 A1 | 6/2010 | Iwasaki |
| 2012/0105712 A1 | 5/2012 | Terahara |
| 2012/0229925 A1 | 9/2012 | Morio et al. |
| 2014/0055014 A1 | 2/2014 | Pan |

FOREIGN PATENT DOCUMENTS

| | | |
|---|---|---|
| EP | 1643282 A1 | 4/2006 |
| JP | 2005-117376 A | 4/2005 |
| JP | 2005-215369 A | 8/2005 |
| JP | 2005-227503 A | 8/2005 |
| JP | 2006-39403 A | 2/2006 |
| JP | 2006-126800 A | 5/2006 |
| JP | 2009-105771 A | 5/2009 |
| JP | 2014-78029 A | 5/2014 |
| WO | 2005003835 A1 | 1/2005 |

OTHER PUBLICATIONS

Written Opinion dated Dec. 22, 2015 during the prosecution of PCT/JP2015/077237 in Japanese language.

IMAGING DEVICE, OPTICAL DEVICE PROVIDED WITH SAME, ELECTRONIC DEVICE PROVIDED WITH SAME, AND METHOD FOR PRODUCING IMAGING DEVICE

This is a continuation of U.S. application Ser. No. 15/548,207, filed Jul. 28, 2017, which is a U.S. national phase application under 35 U.S.C. § 371 of International Patent Application No. PCT/JP2015/077237, filed Sep. 28, 2015, and claims benefit of priority to Japanese Patent Application No. 2015-017346, filed Jan. 30, 2015; Japanese Patent Application No. 2015-070431, filed Mar. 30, 2015; and Japanese Patent Application No. 2015-148027, filed Jul. 27, 2015. The entire contents of these applications are hereby incorporated by reference.

FIELD OF TECHNOLOGY

The present invention relates to an imaging device, to an optical device and an electronic device equipped therewith, and to a method for manufacturing an imaging device.

BACKGROUND

As an imaging device that is used in a vehicle-mounted camera or a monitoring camera there is a known imaging device that comprises a lens holder that holds a lens, a substrate for mounting an imaging element, and a base member for securing the lens holder and the substrate (income for example, Japanese Unexamined Patent Application Publication 2005-215369). In the imaging device disclosed in Patent Japanese Unexamined Patent Application Publication 2005-215369, the center of the imaging element is aligned to the axis of a cylindrical portion of the base member, and is secured to the base member. Moreover, the lens holder is secured to the base member through screwing a male threaded portion of the lens holder into a female threaded portion of the cylindrical portion of the base member after adjusting the focus of the imaging device.

SUMMARY

In the imaging device disclosed in Japanese Unexamined Patent Application Publication 2005-215369, in order to align the axis of the cylindrical portion of the base member (the optical axis of the lens) and the center of the imaging element, the substrate is moved in the directions that are perpendicular to the axis to adjust the centering, after which the base member and the substrate are secured through an adhesive agent.

In the imaging device that is disclosed in Japanese Unexamined Patent Application Publication 2005-215369, the adhesive agent between the base member and the substrate will expand or contract depending on changes in the ambient environment. The distance between the base member and the substrate will vary as the result of expansion and contraction of the adhesive agent, resulting in defocusing in the imaging device that is disclosed in Japanese Unexamined Patent Application Publication 2005-215369.

The present invention was created in contemplation of the situation set forth above, and the object thereof is to provide an imaging device that prevents this defocusing, and to provide an optical device and an electronic device equipped therewith. Moreover, an object is to provide a method for manufacturing an imaging device wherein defocusing is suppressed.

In order to achieve the object set forth above, an imaging device according to a first aspect according to the present invention comprises:

a lens holding member for holding at least one lens, and having, on the image side of the lens, an end face that is perpendicular to the optical axis of the lens;

a base member for holding the lens holding member, having a contact surface that contacts the end face of the lens holding member, in a state wherein the lens holding member is held, and that is perpendicular to the optical axis of the lens, and having an opening portion that is provided in the contact surface and through which the optical axis of the lens passes; and a substrate, secured to the base member, that has an imaging element on which light that passes through the lens is incident after passing through the opening portion of the base member.

This structure is able to suppress defocusing that is caused by, for example, expansion or contraction of the adhesive agent.

Defocusing occurs due to, for example, "a shift of the slope of the optical axis of the lens, in respect to the direction that is perpendicular to the imaging element, or a shift, from a prescribed position, of the position, in the imaging element, of the optical axis of the lens, due to tilting of the lens holding member in respect to the direction that is perpendicular to the imaging element." Moreover, the defocusing occurs due to "a shift, from a prescribed position, in the position of the lens in the optical axial direction of the lens, due to a shift, from a prescribed position, in the position of the lens holding member in the direction of the optical axis of the lens." The structure set forth above can suppress the shift in the slope of the lens holding member in respect to the direction that is perpendicular to the imaging element, and the shift in position of the lens in the optical axial direction, through an end face of the lens holding member contacting a contact surface of the base member. As a result, an imaging device that has a structure as set forth above can suppress defocusing. Because defocusing is suppressed in the imaging device that has the structure that is set forth above, this can suppress degradation of the resolution of the image that is captured.

The base member may have a side face that is continuous with the contact surface and that has a side face that surrounds the outer peripheral surface of the lens holding member in a state wherein the lens holding member is held; and the securing material may be provided between the outer peripheral surface of the lens holding member and the side face of the base member.

This structure can suppress defocusing, because a securing material is disposed between the outer peripheral surface of the lens holding member and the side face of the base member that encompasses the outer peripheral surface of the lens holding member.

The contact surface of the base member may have a circular ring-shaped protruding portion that encompasses the optical axis of the lens, at a peripheral edge portion of the opening portion;

the lens holding member may be of a round cylindrical shape, and may have a circular ring-shaped recessed portion between the inner peripheral surface and the end face;

the inner diameter of the circular ring-shaped recessed portion of the lens holding member may be larger than the outer diameter of the circular ring-shaped protruding portion of the base member; and the depth of the circular ring-shaped recessed portion of the lens holding member may be deeper than the height of the circular ring-shaped protruding portion of the base member.

This structure can prevent the incursion of dust onto the imaging element.

The base member and/or the substrate may have a positioning portion that matches the position of the substrate to a position for securing the base member; and the securing member for securing the substrate to the base member may secure the substrate to the base member at a position wherein the distance of the substrate from the center of the imaging element is less than the distance between the positioning portion and the center of the imaging element of the substrate.

This structure can suppress deformation of the substrate, thereby enabling suppression of defocusing.

The lens holding member may be equipped with a lens barrel for holding the lens, and a barrel holder, for holding the lens barrel, that has the end face.

This structure enables the focus to be adjusted with high accuracy.

The lens barrel may be of a round cylindrical shape and may have a first screw-fastening portion that is provided on the outer peripheral surface thereof, and a first reduced diameter portion that is provided further toward the image side of the lens than the first screw-fastening portion and that has an outer diameter that is less than the outer diameter of the first screw-fasting portion; and the barrel holder may be of a round cylindrical shape and may have a second screw-fastening portion, provided on an inner peripheral surface, for screwing together with the first screw-fastening portion of the lens barrel, and a second reduced diameter portion that is provided further toward the image side of the lens than the second screw-fastening portion and that has an inner diameter that is less than the inner diameter of the second screw-fastening portion, wherein:

the first reduced diameter portion of the lens barrel may be inserted into the second reduced diameter portion of the barrel holder.

This structure can reduce the slope of the lens holding member in respect to the direction that is perpendicular to the imaging element, thereby further suppressing defocusing.

A first biasing member, for biasing the lens barrel in respect to the barrel holder, may be provided between the lens barrel and the barrel holder.

This structure can suppress play between the lens barrel and the barrel holder, enabling further suppression of defocusing.

A second biasing member may be provided for biasing the lens holding member in respect to the base member.

This facilitates easy centering of the lens holding member and enables the focus to be adjusted easily.

The second biasing member may be secured to the base member.

This enables the lens holding member and the base member to be integrated into a single unit. The integrated lens holding member and base member can be removed from the centering apparatus and moved to the bonding process. This simplifies the manufacturing process for the imaging device. The result is the ability to reduce the cost of manufacturing the imaging device.

The second biasing member may contact a portion of the lens holding member from the object side of the lens to bias the lens holding member.

The lens barrel of the lens holding member may have a flange portion that extends out in a direction that is perpendicular to the optical axis of the lens; and a third biasing member may be provided for contacting a portion of the flange portion of the lens barrel from the object side of the lens, to bias the lens barrel and the barrel holder in respect to the base member. Moreover, the third biasing member may be secured to the base member.

An optical device according to a second aspect according to the present invention is provided with an imaging device as set forth above.

An electronic device according to a third aspect according to the present invention is provided with an imaging device as set forth above.

A method for manufacturing an imaging device according to a fourth aspect according to the present invention that comprises:

a lens holding member for holding at least one lens, and having, on the image side of the lens, an end face that is perpendicular to the optical axis of the lens;

a base member for holding the lens holding member, having a contact surface that contacts the end face of the lens holding member, in a state wherein the lens holding member is held, and that is perpendicular to the optical axis of the lens, and having an opening portion that is provided in the contact surface and through which the optical axis of the lens passes; and an imaging element on which light that passes through the lens is incident after passing through the opening portion of the base member, is:

a method for manufacturing an imaging device that includes:

a step for adjusting a position of the optical axis of the lens and of the imaging element through moving the lens holding member in a direction that is perpendicular to the optical axis of the lens in a state wherein the end face of the lens holding member is in contact with the contact surface of the base member.

This enables manufacturing of an imaging device wherein defocusing is suppressed.

The present invention enables suppression of defocusing in the imaging device. Moreover, it can provide a method for manufacturing an imaging device wherein defocusing is suppressed.

BRIEF DESCRIPTIONS OF THE DRAWINGS

DETAILED DESCRIPTION

An imaging device 100 according to the present example will be explained in reference to FIG. 1 through FIG. 7B.

Figure 1A:
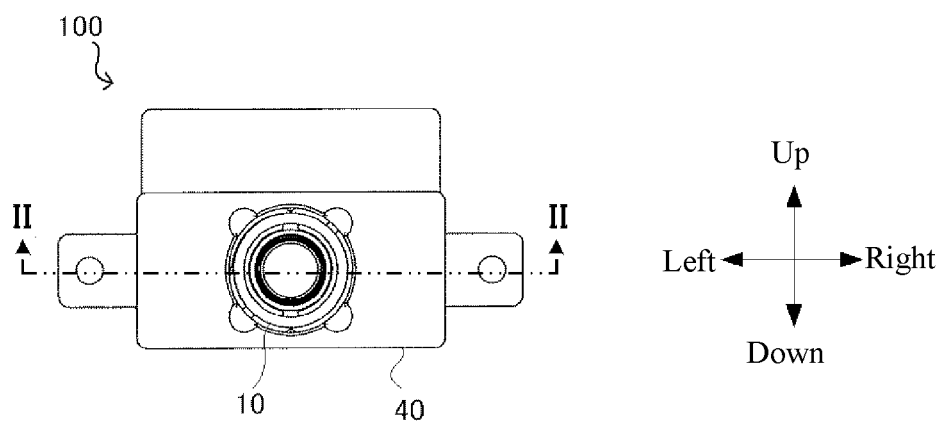
FIG. 1A is a front view of an imaging device according to an example according to the present invention.
Figure 1B:
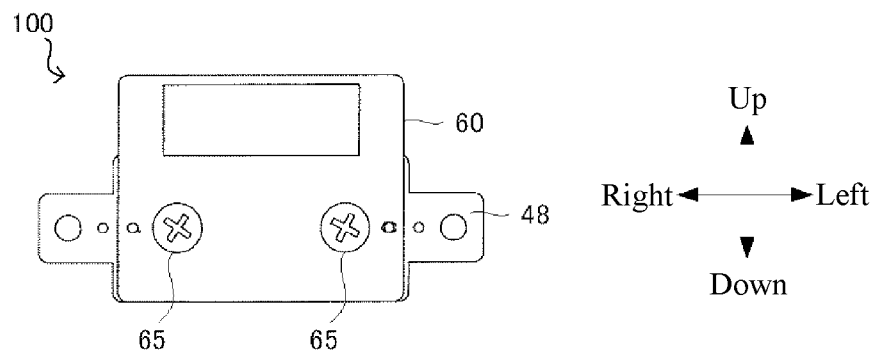
FIG. 1B is a back view of an imaging device according to the example according to the present invention.
Figure 2:
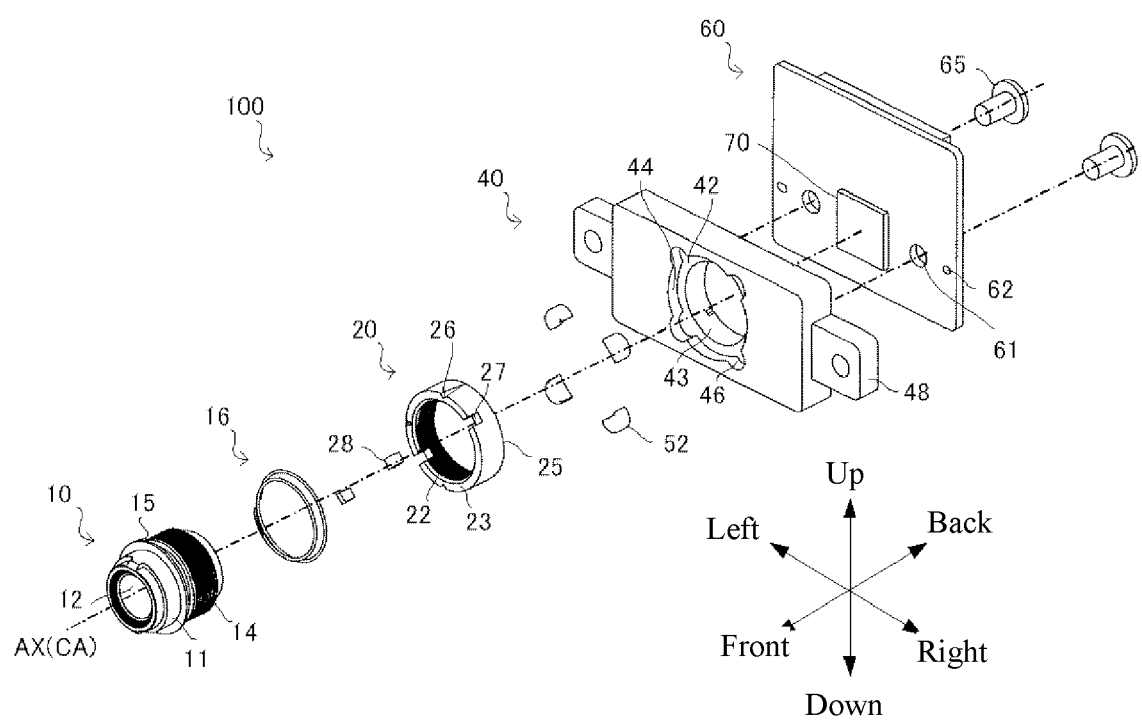
FIG. 2 is an exploded perspective diagram of an imaging device according to an example according to the present invention.

As illustrated in FIG. 1A, FIG. 1B, and FIG. 2, In the imaging device 100, a lens barrel 10 that holds a lens group 12, and a barrel holder 20 are disposed on the front face side (the object side of the lens group 12) of a base member 40. A substrate 60 that has an imaging element 70 is secured to the back face side (the image side of the lens group 12) of the base member 40 by screws 65.

Note that for ease in understanding, the direction of the optical axis AX of the lens group 12 will be defined as the front/back direction, where the side in the direction of the object, or the object side of the lens group 12 will be defined as the "front," and the side in the direction of the image, or the image side of the lens group 12, will be defined as the "back." The direction that is perpendicular to the front/back direction and that extends horizontally is defined as the crosswise direction, and the direction that is perpendicular to the front/back direction and to the crosswise direction is defined as the vertical direction. Moreover, "the direction that is perpendicular to the imaging element 70" indicates the direction that is perpendicular to the imaging surface of the imaging element 70.

Specifically, as illustrated in FIG. 2, the imaging device 100 comprises a lens barrel 10, a conical spring 16, a barrel holder 20, a base member 40, and a substrate 60 that has an imaging element 70.

The lens barrel 10 that holds a lens group 12. The barrel holder 20 holds a lens barrel 10. The conical spring 16 is disposed between the lens barrel 10 and the barrel holder 20. The base member 40 holds the barrel holder 20. The substrate 60 is secured to the base member 40.

The lens barrel 10, the barrel holder 20, and the base member 40 are made from a resin material, a metal material (such as aluminum), or the like. The resin material used in these may be, for example, polycarbonate (PC), polymethyl methacrylate (PMMA), polyethylene, polypropylene, polyvinyl chloride, polystyrene, acrylonitrile-butadiene, -styrene (ABS), polyamide resin (PA), or the like.

Note that in FIG. 2, the direction that slopes downward toward the left in the figure is the object side (the object side of the lens group 12) of the imaging device 100. In FIG. 2, the direction that slopes upward toward the right is the image side of the imaging device 100 (the image side of the lens group 12).

Figure 3:
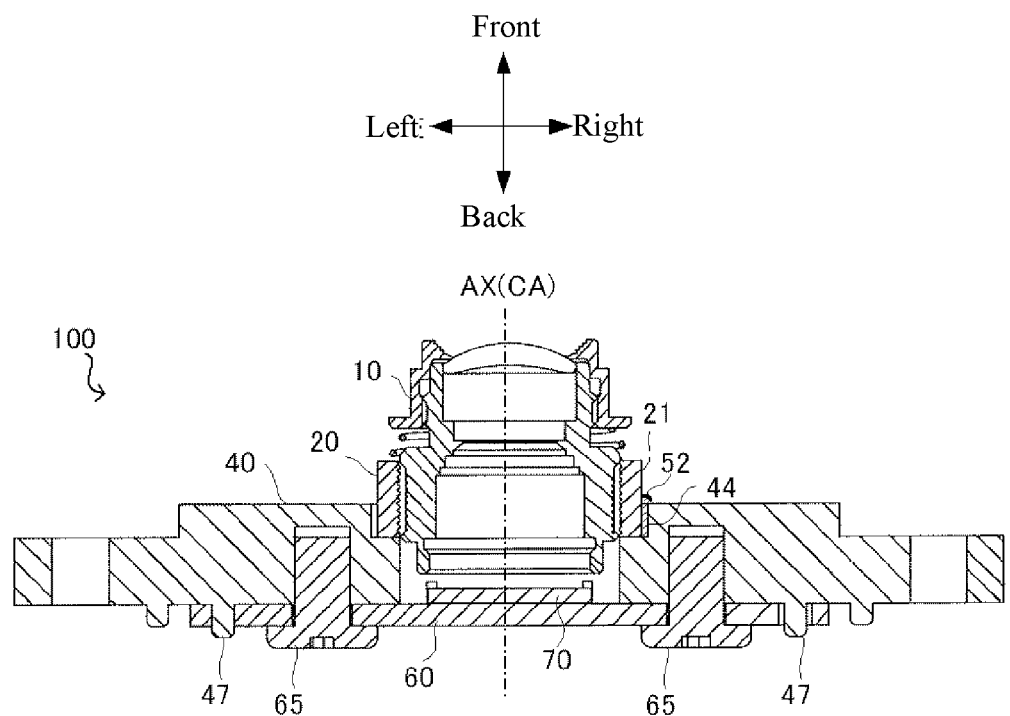
FIG. 3 is a cross-sectional view along the section II-II in the imaging device depicted in FIG. 1A.

Details of the individual members will be explained in reference to FIG. 3 and FIG. 4. Note that in FIG. 3 and FIG. 4, the top of the diagram is the object side, and the bottom is the image side. Moreover, for ease in understanding, the detailed structure of the lens group 12 is not shown.

Figure 4:
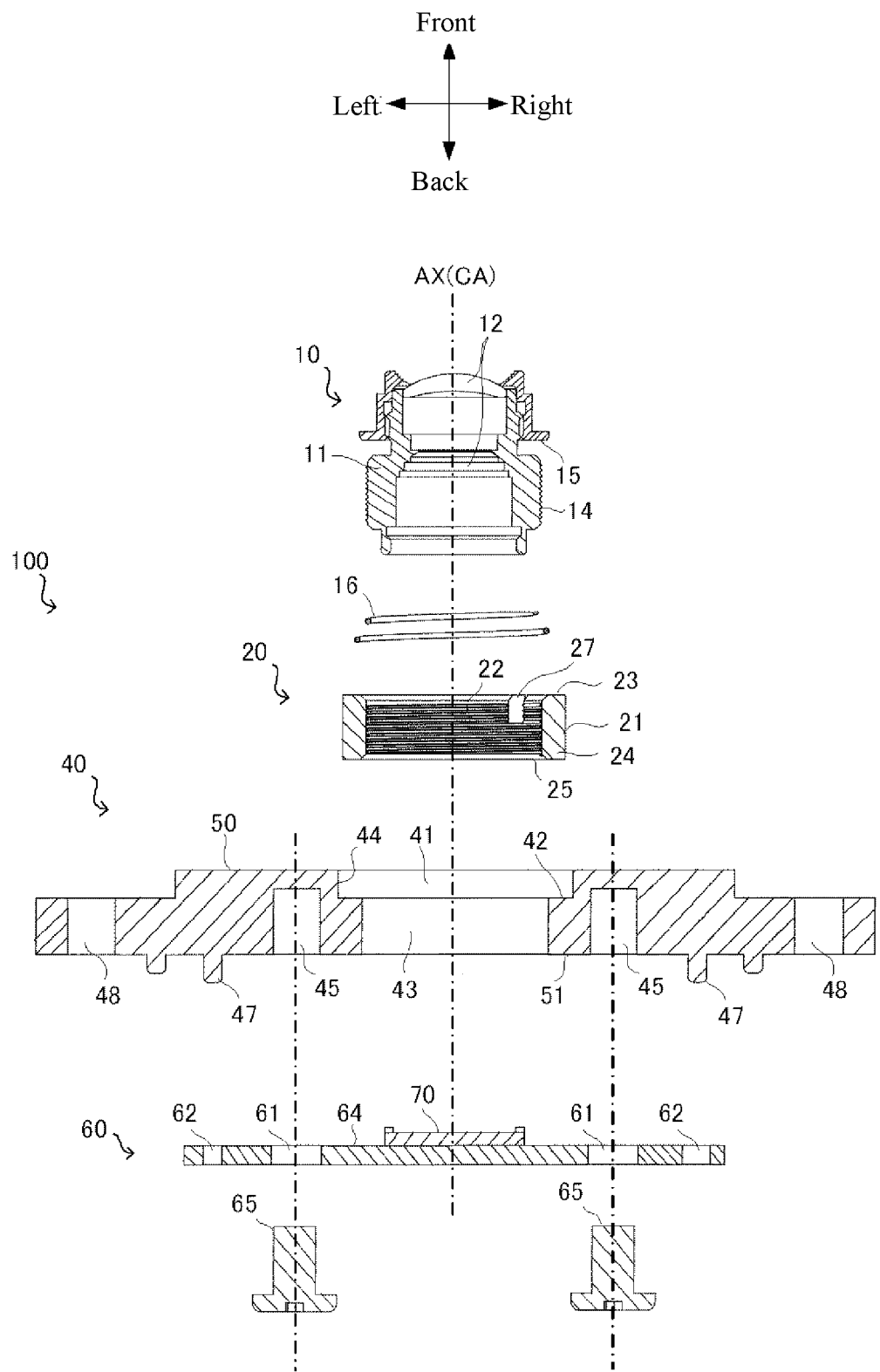
FIG. 4 is a cross-sectional view along the section II-II, with the imaging device that is depicted in FIG. 1A disassembled (an exploded view of the imaging device depicted in FIG. 3).

The lens barrel 10 comprises a cylindrical portion 11 for holding the lens group 12, and a male threaded portion (a first screw-fastening portion) 14 that is formed on the outer peripheral surface of the cylindrical portion 11, as illustrated in FIG. 4. The lens group 12 is structured from a plurality of lenses. The cylindrical portion 11 of the lens barrel 10 has an axis CA. Note that the axis CA of the cylindrical portion 11 of the lens barrel 10 and the optical axis AX of the lens group 12 are coincident. The male threaded portion 14 of the lens barrel 10 is formed in a thread ridge which has, as the axis thereof, the optical axis AX of the lens group 12. The male threaded portion 14 of the lens barrel 10 screws together with a female threaded portion 22 (a second screw-fastening portion) of the barrel holder 20.

The cylindrical portion 11 of the lens barrel 10 is formed in a cylindrical shape. The cylindrical portion 11 of the lens barrel 10 causes the axis CA and the optical axis AX of the lens group 12 to be coincident, and holds the lens group 12. Moreover, the cylindrical portion 11 of the lens barrel 10 may hold an iris, a filter, and the like.

A flange portion 15 that extends out in a direction that is perpendicular to the optical axis AX of the lens group 12 is formed on an outer peripheral surface of the cylindrical portion 11 of the lens barrel 10. A conical spring 16 contacts, in a compressed state, the flange portion 15 of the lens barrel 10. Preferably the surface of the flange portion 15 of the lens barrel 10 that is contacted by the conical spring 16 is a flat surface.

As illustrated in FIG. 4, the conical spring 16 is disposed between the lens barrel 10 and the barrel holder 20. The cylindrical portion 11 of the lens barrel 10 passes through the inner diameter of the conical spring 16, and the front end portion of the conical spring 16 contacts the flange portion 15 of the lens barrel 10. The back end portion of the conical spring 16 contacts the front end face 23 of the barrel holder 20. Consequently, the conical spring 16 is compressed through the lens barrel 10 being screwed into the barrel holder 20, and biases the lens barrel 10 in the direction of the optical axis AX of the lens group 12, in respect to the barrel holder 20.

The conical spring 16 biases the lens barrel 10, in respect to the barrel holder 20, in the direction of the optical axis AX of the lens group 12, enabling prevention of play between the male threaded portion 14 of the lens barrel 10 and the female threaded portion 22 of the barrel holder 20. Consequently, when adjusting the focus of the imaging device 100, the position of the lens barrel 10 can be adjusted with high accuracy in the direction of the optical axis AX of the lens group 12 through screwing the lens barrel 10 into the barrel holder 20.

As depicted in FIG. 4, the barrel holder 20 has a cylindrical trunk portion 21. The trunk portion 21 of the barrel holder 20 has an axis CA that is coincident with the optical axis AX of the lens group 12. The trunk portion 21 of the barrel holder 20 is provided with a female threaded portion 22 (a second screw-fastening portion), on the inner peripheral surface thereof, that screws together with the male threaded portion 14 of the lens barrel 10. The female threaded portion 22 of the barrel holder 20 is formed with threaded grooves, having the optical axis AX of the lens group 12 as the axis thereof. The male threaded portion 14 of the lens barrel 10 can be screwed into the female threaded portion 22 of the barrel holder 20 to adjust the position of the lens barrel 10 in the direction of the optical axis AX of the lens group 12.

The front end face 23 of the barrel holder 20 makes contact with the back end portion of the conical spring 16 in a state wherein the conical spring 16 is compressed. The front end face 23 of the barrel holder 20 is the end face of the barrel holder 20 on the object side of the lens group 12. Preferably the front end face 23 of the barrel holder 20 is perpendicular to the optical axis AX of the lens group 12, and is flat.

The barrel holder 20 has, on the back end portion 24 thereof, a back end face 25 that is in contact with a base member 40. The back end portion 24 of the barrel holder 20 is positioned on the image side of the lens group 12, and the back end face 25 of the barrel holder 20 is an end face, of the barrel holder 20, that is perpendicular to the optical axis AX of the lens group 12, on the image side of the lens group 12. Preferably the back end face 25 of the barrel holder 20 is flat, so as to suppress tilting of the axis CA of the lens barrel 10 and the barrel holder 20 in respect to the direction that is perpendicular to the imaging element 70.

As illustrated in FIG. 2, two filling holes 27 are provided in a trunk portion 21 of the barrel holder 20, for injection of an adhesive agent 28 for securing the lens barrel 10. Two chuck grooves 26 are provided in the trunk portion 21 of the barrel holder 20, by which a gripping member, not shown, grasps the barrel holder 20 in a centering step, described below.

The chuck grooves 26 are triangular notched portions.

The adhesive agent 28 is, for example, an ultraviolet radiation curable adhesive agent, a thermally curable adhesive agent, or the like.

The base member 40 is a rectangular plate-shaped body, as illustrated in FIG. 2. The base member 40 has, in the center portion of the front end face 50 thereof, a first opening portion 41 of a round cylindrical shape. Moreover, the base member 40 has an attaching portion 48 for attaching the imaging device 100 to an applicable object (for example, a vehicle).

The first opening portion 41 of the base member 40 holds the barrel holder 20. The first opening portion 41 of the base member 40 has a contact surface 42, which is perpendicular to the optical axis AX of the lens group 12, for contacting the back end face 25 of the barrel holder 20 directly. The contact surface 42 corresponds to the bottom face of the first opening portion 41 of the base member 40. Preferably the contact surface 42 of the base member 40 is flat, in order to suppress tilting of the axis CA of the lens barrel 10 and the barrel holder 20 in respect to the direction that is perpendicular to the contact surface 42 of the base member 40.

The inner diameter of the first opening portion 41 of the base member 40 is larger than the outer diameter of the back end portion 24 of the barrel holder 20. As a result, the barrel holder 20 that holds the lens barrel 10 is able to move in the directions that are perpendicular to the optical axis AX of the lens group 12 in a state wherein the back end face 25 of the barrel holder 20 is in contact with the contact surface 42 of the base member 40. This enables the position of the barrel holder 20 to be adjusted in the directions that are perpendicular to the optical axis AX of the lens group 12. Adjusting of the position of the barrel holder 20 will be described below.

Moreover, because the inner diameter of the first opening portion 41 of the base member 40 is larger than the outer diameter of the back end portion 24 of the barrel holder 20, the side face 44 of the first opening portion 41 encompasses the back end portion 24 of the barrel holder 20. The barrel holder 20 is secured to the base member 40 through bonding of the side face 44 of the first opening portion 41 of the base member 40 and the outer peripheral surface of the barrel holder 20 (the trunk portion 21 of the barrel holder 20) by an adhesive agent 52.

Note that a filling groove 46 is formed in the side face 44 of the first opening portion 41 in order to inject the adhesive agent 52.

The base member 40 has a second opening portion 43 in the contact surface 42 wherein the inner diameter is smaller than the inner diameter of the first opening portion 41. The second opening portion 43 passes through the base member 40. As illustrated in FIG. 3, a substrate 60, which has an imaging element 70, is secured by screws 65 to the back end face 51 of the base member 40. The back end face 51 of the base member 40 is the end face of the base member 40 on the image side of the lens group 12.

Preferably the back end face 51 of the base member 40 is flat so that the imaging surface of the imaging element 70 that is mounted on the substrate 60 will be parallel with the back end face 51 of the base member 40.

As illustrated in FIG. 4, on the back end face 51 of the base member 40, two positioning bosses 47 are provided with the second opening portion 43 therebetween. The position wherein the substrate 60 is secured to the base member 40 is aligned by the positioning bosses 47 of the base member 40. The positioning bosses 47 of the base member 40 are inserted into respective corresponding positioning holes 62 of the substrate 60. Given this, in a state wherein the base member 40 holds the barrel holder 20, the substrate 60 is located in a position wherein the optical axis AX of the lens group 12 passes through the center of the imaging element 70 of the substrate 60.

Two screws 65 pass through respective through holes 61 of the substrate 60, to secure the substrate 60 to the back end face 51 of the base member 40. The respective screws 65 are screwed into respective screw holes 45 of the base member 40.

As illustrated in FIG. 4, the distance L1 between the through hole 61 of the substrate 60 (the screw 65) and the center of the imaging element 70 of the substrate 60 is shorter than the distance L2 between the positioning hole 62 of the substrate 60 and of the center of the imaging element 70 of the substrate 60. As a result, the screw 65 secures the substrate 60 to the base member 40 at a position wherein the distance from the center of the imaging element 70 is shorter than the distance between the positioning hole 62 of the substrate 60 and the center of the imaging element 70. This enables suppression of variation in the position of the imaging element 70, in the direction of the optical axis AX of the lens group 12, due to variation in temperature and humidity.

Figure 5A:
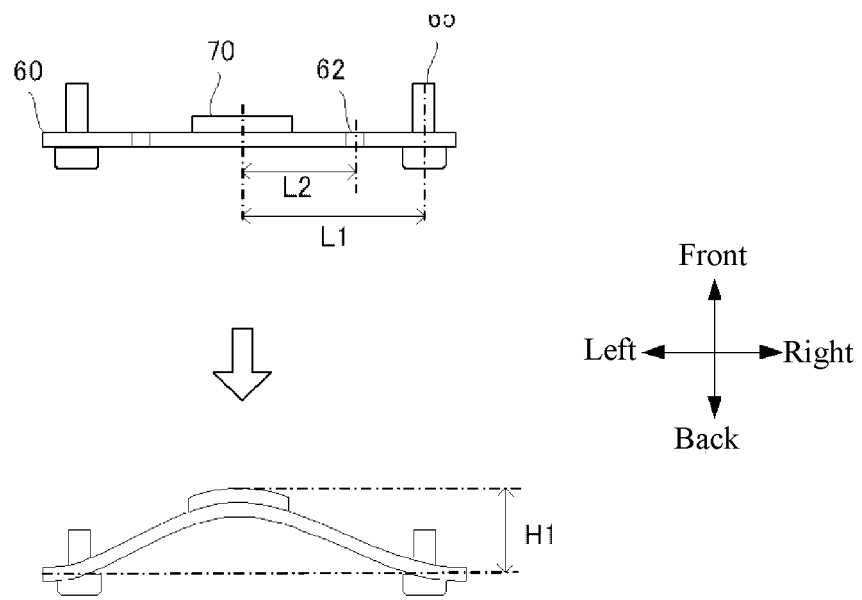
FIG. 5A is a schematic diagram for explaining the warping of a substrate.

For example, the substrate 60 will warp in response to changes in temperature and humidity. As illustrated in FIG. 5A, when the distance L1 between the center of the imaging element 70 and the through hole 61 (the screw 65) is longer than the distance L2 between the positioning hole 62 and the center of the imaging element 70, the amount of change H1 in the position of the imaging element 70, in the direction of the optical axis AX of the lens group 12, will become larger.

Figure 5B:
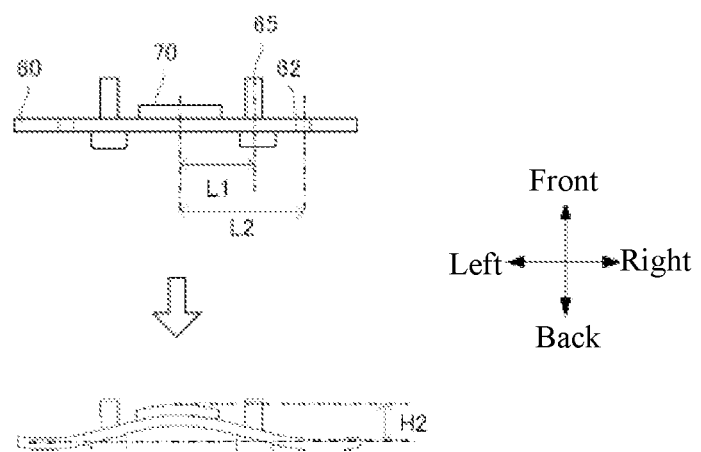
FIG. 5B is a schematic diagram for explaining warping of a substrate in the example according to the present invention.

On the other hand, as illustrated in FIG. 5B, when the distance L1 between the center of the imaging element 70 and the through hole 61 (the screw 65) is shorter than the distance L2 between the positioning hole 62 and the center of the imaging element 70, the amount of change H2 in the position of the imaging element 70, in the direction of the optical axis AX of the lens group 12, will be smaller. Because the defocusing in the imaging device 100 is suppressed through reducing the change in the position of the imaging element 70, preferably the screws 65 secure the substrate 60 to the base member 40 at positions wherein the distances from the center of the imaging element 70 are shorter than the distance from the positioning hole 62 to the center of the imaging element 70.

The imaging element 70 is structured from a CCD (Charge Coupled Device) imaging sensor or a CMOS (Complementary Metal Oxide Semiconductor) imaging sensor, or the like. The imaging element 70, as illustrated in FIG. 4, is mounted on a surface 64 of the substrate 60 that faces the back end face 51 of the base member 40 so that the imaging surface of the imaging element 70 faces the second opening portion 43 of the base member 40. The imaging surface of the imaging element 70 is the surface whereon the image is focused through the lens group 12. That is, the light that passes through the lens group 12 and that passes through the first opening portion of 41 and second opening portion 43 of the base member 40 is incident onto the imaging surface of the imaging element 70. Preferably the imaging element 70 is mounted so that the imaging surface of the imaging element 70 is parallel with the surface 64 of the substrate 60. Moreover, preferably the surface 64 of the substrate 60 is a flat surface.

The imaging element 70 may be provided with a cover glass, and the like.

The substrate 60 that has the imaging element 70 is secured by the screws 65 to the base member 40. The position at which the substrate 60 is secured to the base member 40 is aligned through the insertion of the positioning bosses 47 of the base member 40 into the positioning holes 62 of the substrate 60.

As illustrated in FIG. 4, through holes 61 are provided, with the imaging element 70 therebetween, in the substrate 60. The screws 65 are passed through the through holes 61 of the substrate 60 to secure the substrate 60 to the base member 40. Positioning holes 62, into which the positioning bosses 47 of the base member 40 are inserted, are provided in the substrate 60, with the imaging element 70 therebetween.

The method for manufacturing the imaging device 100 will be explained next.

A lens barrel 10 for securing the lens group 12 on the inner peripheral surface of the cylindrical portion 11 is prepared. Here the axis CA of the lens barrel 10 and the optical axis AX of the lens group 12 are coincident. Moreover, a substrate 60, on which the imaging element 70 is mounted, a barrel holder 20, a conical spring 16, screws 65, and adhesive agents 28 and 52 are prepared.

Following this, in a state wherein the cylindrical portion 11 of the lens barrel 10 passes through the inner diameter of the conical spring 16, the male threaded portion 14 of the lens barrel 10 is screwed into the female threaded portion 22 of the barrel holder 20, to provisionally secure the lens barrel 10 and the barrel holder 20 (a lens barrel provisional securing step).

Moreover, in a state wherein the positioning bosses 47 of the base member 40 are inserted into the positioning holes 62 of the substrate 60, screws 65 are passed through the through holes 61 of the substrate 60 and screwed into the screw holes 45 of the base member 40. The substrate 60 is secured to the base member 40 thereby (a substrate securing step).

Following this, the barrel holder 20, which has been provisionally secured to the lens barrel 10, and the base member 40, to which the substrate 60 is secured, are placed in a centering apparatus, not shown.

Figure 6A:
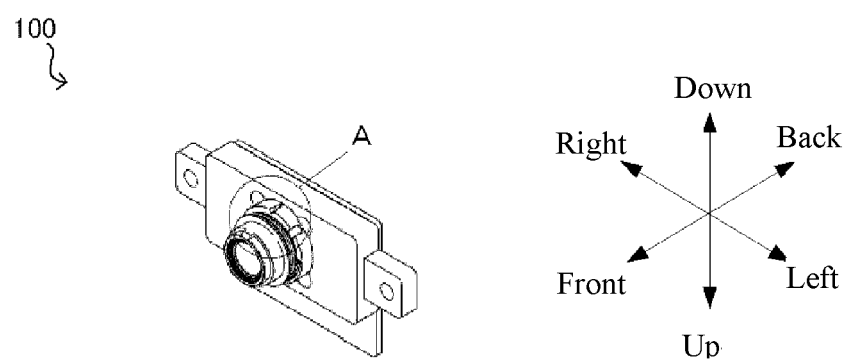
FIG. 6A is a perspective diagram of an imaging device according to the example according to the present invention.
Figure 6B:
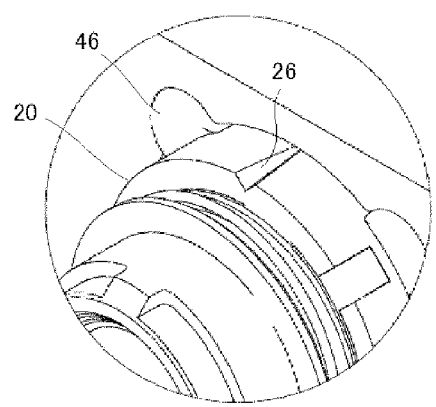
FIG. 6B is an enlarged view of the A portion depicted in FIG. 6A.
Figure 7A:
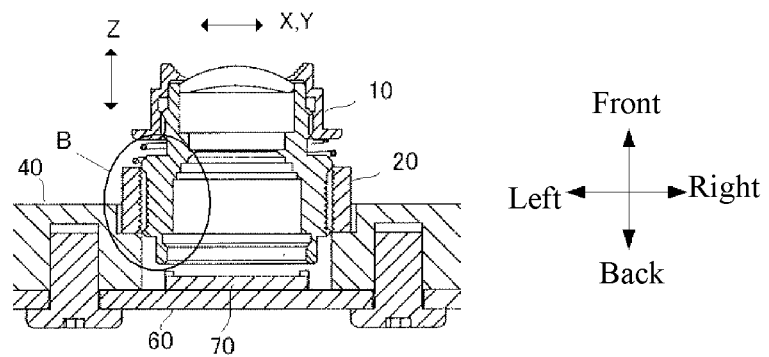
FIG. 7A is a schematic diagram for explaining the connection between the barrel holder and the base member in the example according to the present invention.
Figure 7B:
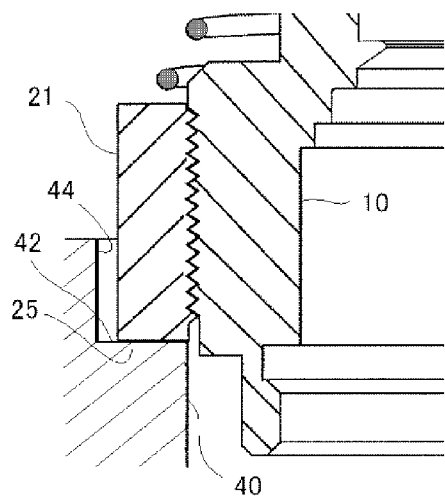
FIG. 7B is an enlarged view of the B portion depicted in FIG. 7A.

Given this, as illustrated in FIG. 6A, FIG. 6B, and FIG. 7A, the chuck grooves 26 of the barrel holder 20 wherein the lens barrel 10 is temporarily secured are grasped by a gripping member, and the back end face 25 of the barrel holder 20 is pressed against the contact surface 42 of the base member 40. The back end face 25 of the barrel holder 20 is caused thereby to contact the contact surface 42 of the base member 40.

Electric power is supplied to the imaging element 70, the barrel holder 20 and the base member 40 are placed in the centering apparatus, and the imaging element 70 is capturing an image of a chart. Given this, in a state wherein the back end face 25 of the barrel holder 20 is in contact with the contact surface 42 of the base member 40, the barrel holder 20 is moved in the X and Y directions, which are perpendicular to the optical axis AX of the lens group 12, as illustrated in FIG. 7A, while the image of the chart that is imaged is observed. Through this, the position of the barrel holder 20 (the position of the barrel holder 20 in the directions that are perpendicular to the optical axis AX of the lens group 12) is adjusted to a position wherein the center of the imaging element 70 and the optical axis AX of the lens group 12 are coincident (a centering step).

In a state wherein the back end face 25 of the barrel holder 20 is in contact with the contact surface 42 of the base member 40 and the center of the imaging element 70 and the optical axis AX of the lens group 12 are coincident, the adhesive agent 52 is injected between the side face 44 of the base member 40 and the outer peripheral surface of the barrel holder 20 (the trunk portion 21 of the barrel holder 20), and then cured. The barrel holder 20 is secured to the base member 40 thereby (a barrel holder bonding step).

Note that the adhesive agent 52 may be, for example, an ultraviolet radiation curable adhesive agent or a thermally curable adhesive agent.

While the chart image is observed again, the lens barrel 10 is rotated to adjust the amount to which the lens barrel 10 is screwed into the barrel holder 20. The lens barrel 10 is removed thereby in the Z direction along the optical axis AX of the lens group 12, as illustrated in FIG. 7A, to adjust the focus (the position of the lens barrel 10 along the optical axis AX of the lens group 12) (a focus adjusting step).

Finally, the adhesive agent 28 is injected through the filling hole 27 of the barrel holder 20, between the lens barrel 10 and the barrel holder 20, and cured. The lens barrel 10 is secured to the barrel holder 20 thereby (a lens barrel bonding step).

The imaging device 100 is manufactured through the steps set forth above.

As described above, in the imaging device 100, the back end face 25 of the barrel holder 20 is in contact with the contact surface 42 of the base member 40, to prevent the lens barrel 10 and the barrel holder 20 (that is, the axis CA and the optical axis AX of the lens group 12) from being tilted in respect to the direction that is perpendicular to the imaging element 70. Moreover, this can also suppress shifting, from the prescribed position, of the position of the lens barrel 10 and the barrel holder 20 in the direction of the optical axis AX of the lens group 12. The result is the ability to suppress defocusing in the imaging device 100.

Moreover, the barrel holder 20 and the base member 40 are secured by the adhesive agent 52, and the outer peripheral surface of the barrel holder 20 and the side face 44 of the base member 40, which is continuous with the contact surface 42, are secured together, enabling suppression of tilting of the lens barrel 10 and the barrel holder 20, in respect to the direction that is perpendicular to the imaging element 70, that would be caused by expansion or contraction of the adhesive agent 52. Moreover, this enables also suppression of shifting, from the prescribed position, of the position of the lens barrel 10 and the barrel holder 20 in the direction of the optical axis AX of the lens group 12, which would be caused by expansion or contraction of the adhesive agent 52. As a result, this enables further suppression of defocusing in the imaging device 100.

Furthermore, in the method for manufacturing the imaging device 100, as described above, the adhesive agent 52 is injected between the side face 44 of the first opening portion 41 and the outer peripheral surface of the barrel holder 20 in a state wherein the back end face 25 of the barrel holder 20 is in contact with the contact surface 42 of the base member 40, and the adhesive agent 52 is cured while in this state, so that the adhesive agent 52 does not incur between the back end face 25 of the barrel holder 20 and the contact surface 42 of the base member 40. As a result, the lens barrel 10 and the barrel holder 20 will not be tilted, in respect to the direction that is perpendicular to the imaging element 70, through expansion or contraction of the adhesive agent 52. There will also be no shift, from the prescribed position, of the position of the lens barrel 10 and the barrel holder 20 in the direction of the optical axis AX of the lens group 12 through expansion or contraction of the adhesive agent 52. As a result, the method for manufacturing the imaging device 100 can suppress defocusing in the imaging device 100.

Moreover, the position of the lens barrel 10 in the direction of the optical axis AX of the lens group 12 can be adjusted through adjusting the amount to which the lens barrel 10 is screwed into the barrel holder 20, through rotating the lens barrel 10, enabling the focus in the imaging device 100 to be adjusted easily. Moreover, in the centering step, the barrel holder 20 is moved in the directions that are perpendicular to the optical axis AX of the lens group 12 in a state wherein the back end face 25 of the barrel holder 20 is in contact with the contact surface 42 of the base member 40, enabling the position of the barrel holder 20 be adjusted easily in the directions that are perpendicular to the optical axis AX of the lens group 12.

While in the above example, the male threaded portion 14 was provided in the lens barrel 10 and the female threaded portion 22 was provided in the barrel holder 20, the female threads may instead be provided in the lens barrel 10 and the male threads may be provided in the barrel holder 20.

Moreover, the external shapes of the various members are not limited to the shapes that are illustrated, but may be arbitrary shapes insofar as they are shapes wherein the functions of the various members are achieved. For example, the external shape of the base member 40 need not be rectangular. Furthermore, the shapes of the positioning bosses 47 of the base member 40 may be shapes that correspond to the shapes of the positioning holes 62 of the substrate 60.

Moreover, the adhesive agent 28 may be a member for securing the lens barrel 10 and the barrel holder 20. Furthermore, the adhesive agent 52 may be a member for securing the barrel holder 20 and the base member 40. Consequently, the materials, and the like, of these members are arbitrary, insofar as the members have the function of securing objects together.

In the above example, in the barrel holder 20 the lens barrel 10 was held through mating of the thread ridges and the threaded grooves (the female threaded portion 22 and the male threaded portion 14). The structure of the barrel holder 20 for holding the lens barrel 10 is arbitrary. In this case, preferably the structure enables the adjustment of the position of the lens barrel 10 in the direction of the optical axis AX of the lens group 12.

Moreover, at least one circular column-shaped protrusion may be provided as a thread ridge on the outer peripheral surface of the lens barrel 10 in the male threaded portion 14 of the lens barrel 10. In this case, the female threaded portion 22 of the barrel holder 20 may be a L-shaped groove that is formed on the inner peripheral surface of the barrel holder 20, structured from a groove that extends in the direction of the axis CA from the front end face 23 and a groove that is turned in a right angle from the bottom end of the groove that extends in the direction of the axis CA. The protrusion of the male threaded portion 14 may be fitted into the groove that extends in the direction of the axis CA of the female threaded portion 22, and after the lens barrel 10 has been inserted in the direction of the axis CA, the lens barrel 10 may be rotated to cause the lens barrel 10 and the barrel holder 20 to be locked. The barrel holder 20 can hold the lens barrel 10 thereby. A position wherein the thread ridge is cut part way (a position wherein there is no protrusion provided) may be provided in the female threaded portion 22 of the lens barrel 10, and a parting line may be formed at this position.

The lens barrel 10 and the barrel holder 20 may be formed integrally. Moreover, the lens holding member wherein the lens barrel 10 and the barrel holder 20 are formed integrally may be provided with an end face that is perpendicular to the optical axis AX of the lens group 12, on the image side of the lens group 12, for making contact with the contact surface 42 of the base member 40.

In the above example, the base member 40 has a first opening portion 41 that holds the barrel holder 20, where the bottom face of the first opening portion 41 corresponds to the contact surface 42 of the base member 40. The structure wherein the base member 40 holds the barrel holder 20 is not limited thereto. For example, a front end face 50 of the base member 40 may be used as the contact surface 42, and a wall portion may be provided that surrounds the first opening portion 41, at the front end face 50 of the base member 40. In this case, the side face of this wall portion would be the side face that surrounds the outer peripheral surface of the barrel holder 20. Moreover, a first opening portion 41 of the base member 40 may pass through the base member 40, and the base member 40 may be provided with a second opening portion 43. Note that the peripheral surface of the barrel holder 20 and the front end face 50 of the base member 40 may be secured by an adhesive agent without the provision of a wall portion on the front end face 50 of the base member 40.

Figure 8:
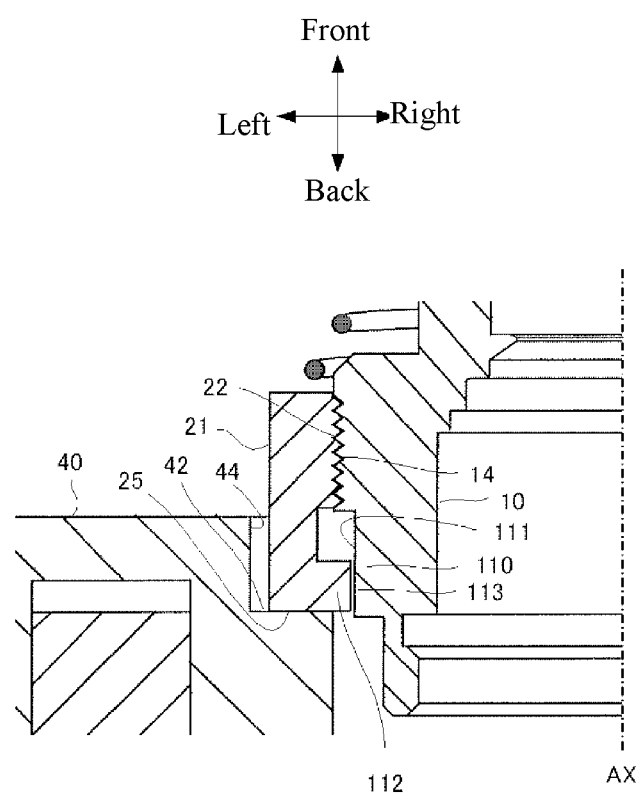
FIG. 8 is a schematic diagram for explaining the connection between the barrel holder and the base member in another example according to the present invention.

In a another example, as illustrated in FIG. 8, the lens barrel 10 is provided with a first reduced diameter portion 110 having an outer diameter that is smaller than an outer diameter of the male threaded portion 14, on an outer peripheral surface 111 that is further to the image side of the lens group 12 than the male threaded portion 14. Moreover, the barrel holder 20 is provided with a second reduced diameter portion 112 having an inner diameter that is smaller than the inner diameter of the female threaded portion 22, further toward the inner peripheral surface 113 on the image side of the lens group 12 than the female threaded portion 22.

In the present example, the outer diameter of the lens barrel 10 in the first reduced diameter portion 110 is smaller than the inner diameter of the barrel holder 20 at the second reduced diameter portion 112 of the barrel holder 20. Additionally, the first reduced diameter portion 110 of the lens barrel 10 is inserted into the second reduced diameter portion 112 of the barrel holder 20.

In this barrel, the position of the lens barrel 10 is aligned through the male threaded portion 14 of the lens barrel 10 and the female threaded portion 22 of the barrel holder 20, and the first reduced diameter portion 110 of the lens barrel 10 and the second reduced diameter portion 112 of the barrel holder 20, thus enabling further suppression of tilting of the lens barrel 10 and the barrel holder 20 in respect to the direction that is perpendicular to the imaging element 70.

Moreover, when the lens barrel 10 is screwed into the barrel holder 20, dust that is generated from the male threaded portion 14 and the female threaded portion 22 (flaked-off material) is captured in the gap between the outer peripheral surface 111 of the first reduced diameter portion 110 and the inner peripheral surface 113 of the second reduced diameter portion 112, preventing this dust from dropping onto the imaging element 70.

Note that the gap between the outer peripheral surface 111 of the first reduced diameter portion 110 of the lens barrel 10 and the inner peripheral surface 113 of the second reduced diameter portion 112 of the barrel holder 20 should be of a size that enables the first reduced diameter portion 110 of the lens barrel 10 to be inserted into the second reduced diameter portion 112 of the barrel holder 20. Preferably the gap between the outer peripheral surface 111 of the first reduced diameter portion 110 of the lens barrel 10 and the inner peripheral surface 113 of the second reduced diameter portion 112 of the barrel holder 20 is less than the play between the male threaded portion 14 of the lens barrel 10 and the female threaded portion 22 of the barrel holder 20. This enables a further suppression of tilting of the lens barrel 10 and the barrel holder 20 in respect to the direction that is perpendicular to the imaging element 70. Moreover, this prevents finer dust from dropping onto the imaging element 70.

Figure 9A:
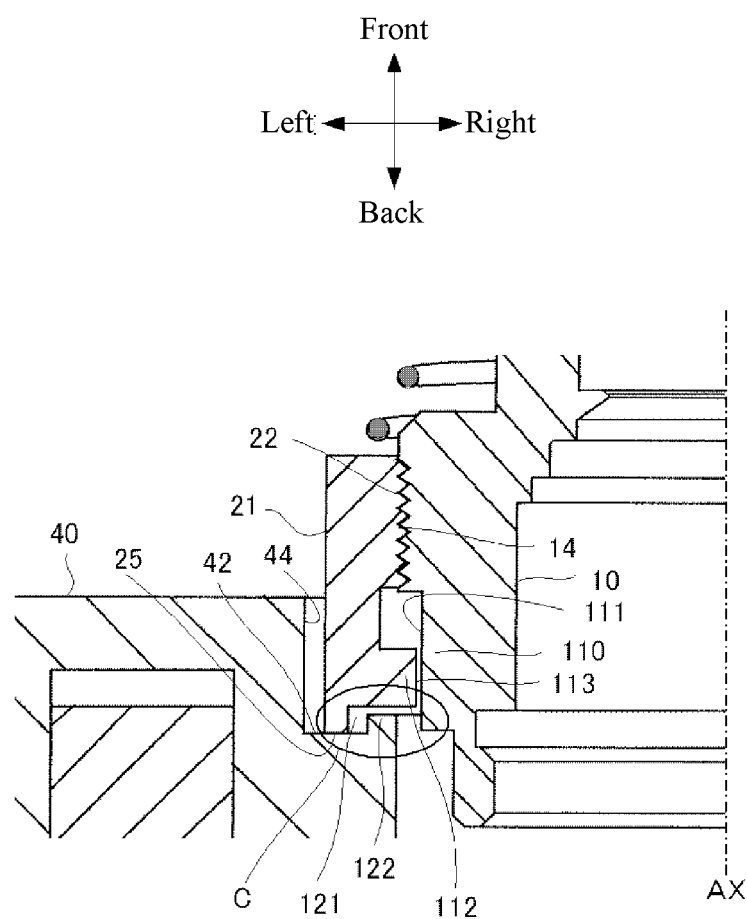
FIG. 9A is a schematic diagram for explaining the connection between the barrel holder and the base member in a further example according to the present invention.

In a further example, as illustrated in FIG. 9A, the barrel holder 20 has a circular ring-shaped recessed portion 121 between the inner peripheral surface 113 and the back end face 25. Moreover, the contact surface 42 of the base member 40 has a circular ring-shaped protruding portion 122, encircling the optical axis AX of the lens group 12, at a peripheral edge portion of the second opening portion 43.

Figure 9B:
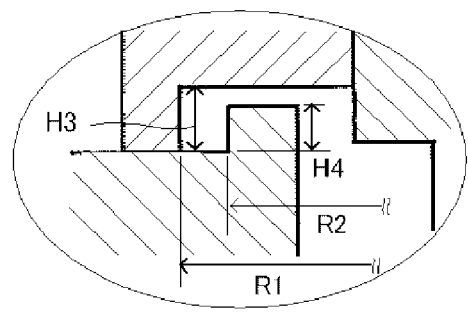
FIG. 9B is an enlarged view of the C portion depicted in FIG. 9A.

As illustrated in FIG. 9B, the depth H3 of the recessed portion 121 from the end face 25 of the barrel holder 20 is deeper than the height H4 of the protruding portion 122 from the contact surface 42 of the base member 40. Moreover, the inner diameter R1 of the recessed portion 121 of the barrel holder 20 is larger than the outer diameter R2 of the protruding portion 122 of the base member 40.

Moreover, given this structure, the protruding portion 122 of the contact surface 42 is provided between a part of the contact surface 42 of the base member 40 wherein the back end face 25 of the barrel holder 20 moves and the second opening portion 43 of the contact surface 42. Consequently, dust that is produced when, in the centering step, the barrel holder 20 is moved in a state wherein the back end face 25 of the barrel holder 20 is in contact with the contact surface 42 of the base member 40, is prevented from dropping onto the imaging element 70. Note that preferably the difference between the depth H3 of the recessed portion 121 of the barrel holder 20 and the height H4 of the protruding portion 122 of the base member 40, height H4 should be smaller than depth H3.

Figure 10A:
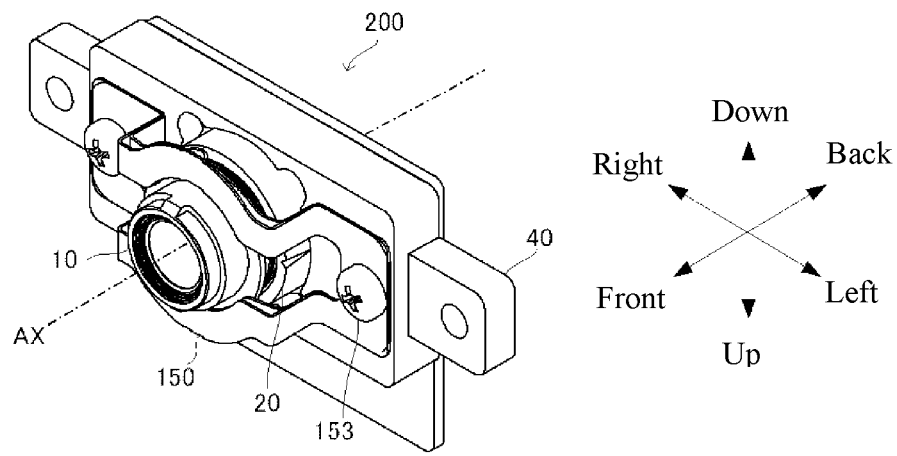
FIG. 10A is a perspective diagram of an imaging device according to a yet further example according to the present invention.

The imaging device 200 according to the present example, as illustrated in FIG. 10A, is provided integrally with a leaf spring 150 that elastically biases the lens barrel 10 and the barrel holder 20, in respect to the base member 40, instead of the conical spring 16 of the imaging device 100 in the above example. The other structures are the same as in the other examples.

Figure 10B:
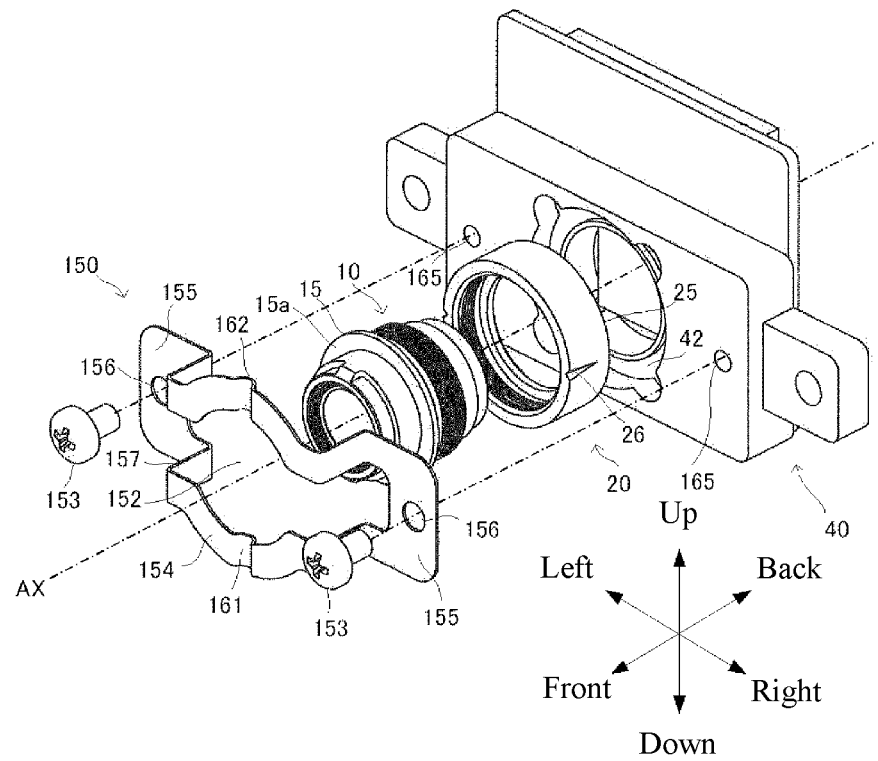
FIG. 10B is an exploded perspective diagram of an imaging device according to the example according to the present invention.

The leaf spring 150 is a member that has elasticity. The leaf spring 150 is made from metal, a resin material, or the like. As illustrated in FIG. 10B, the leaf spring 150 has a center portion 154 and side portions 155 that are perpendicular to the optical axis AX of the lens group 12. The center portion 154 and the side portion 155 of the leaf spring 150 are connected through a connecting portion 157 that extends in the direction of the optical axis AX of the lens group 12.

The two side portions 155 of the leaf spring 150 have respective screw holes 156. The leaf spring 150 is secured to the base member 40 through screws 153 that pass through the screw holes 156.

The center portion 154 of the leaf spring 150 has a circular opening 152. The lens barrel 10 is inserted into the opening 152 of the leaf spring 150. The inner diameter of the opening 152 of the leaf spring 150 is larger than the outer diameter of the lens barrel 10 at the front end portion thereof, and smaller than the outer diameter of the flange portion 15 of the lens barrel 10.

Figure 11A:
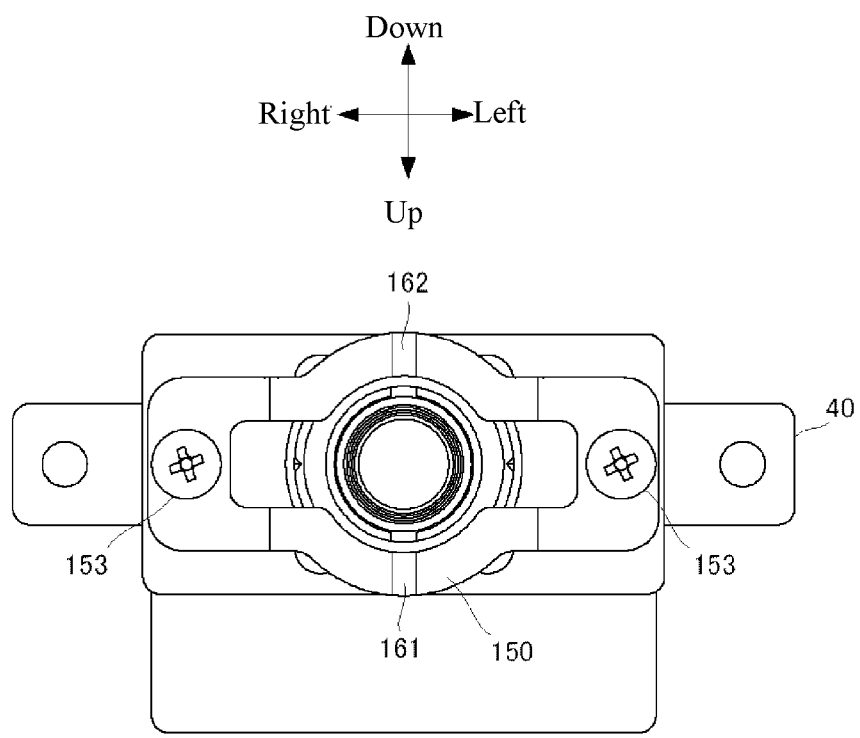
FIG. 11A is a front view of an imaging device according to the yet further example.
Figure 11B:
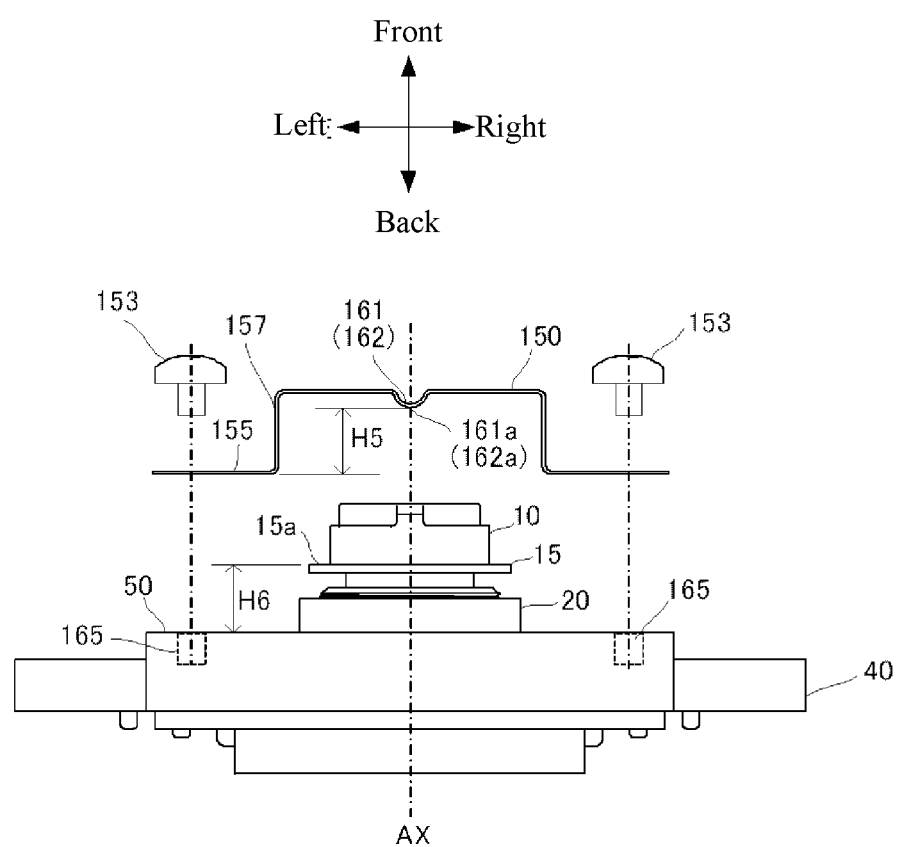
FIG. 11B is a schematic diagram for explaining a leaf spring related to the yet further example according to the present invention.
Figure 11C:
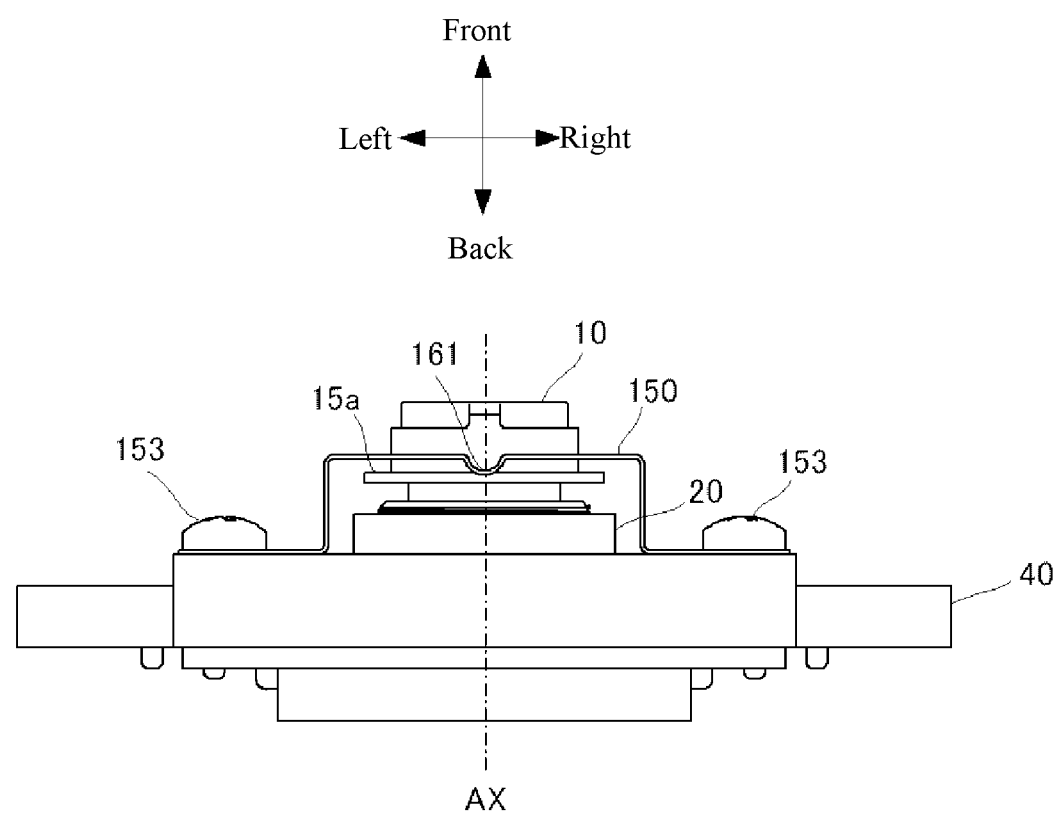
FIG. 11C is a bottom view of an imaging device according to the yet further example according to the present invention.

As illustrated in FIG. 10B and FIG. 11B, the center portion 154 of the leaf spring 150 has, at a peripheral edge portion of the opening 152, a bend portion 161 and a bend portion 162 that are bent toward the image side of the lens group 12. The bend portion 161 and the bend portion 162 of the leaf spring 150 are provided at symmetrical positions, in the vertical direction, with the lens barrel 10 therebetween. The lens barrel 10 is inserted into the opening 152 of the leaf spring 150, and because the inner diameter of the opening 152 of the leaf spring 150 is less than the outer diameter of the flange portion 15 in the lens barrel 10, the end portions 161 and 162 of the leaf spring 150 make linear contact with the front face 15a of the flange portion 15 of the lens barrel 10 from the object side of the lens group 12, as illustrated in FIG. 11C.

As illustrated in FIG. 11B, the height H5 from the bottom face of the side portion 155 of the leaf spring 150 to the back end portion 161a of the bend portion 161 (that is, the height of the bend portion) is less than the height H6 from the front end face 50 of the base member 40 to the front face 15a of the flange portion 15 of the lens barrel 10 (the height of the flange portion) (H5<H6). Moreover, the height H5 of the bend portion in the bend portion 162 is also less than the height H6 of the flange portion 15 of the lens barrel 10 (H5<H6). Consequently, the leaf spring 150 elastically biases the lens barrel 10 and the barrel holder 20, which holds the lens barrel 10, from the object side of the lens group 12, in respect to the base member 40. In this case, the back end face 25 of the barrel holder 20 contacts the contact surface 42 of the base member 40 directly, in the same way as in the previous example.

Here "elastically biases" means biasing in such a way that the lens barrel 10 and the barrel holder 20 are able to move through the application of an external force, from a direction that is perpendicular to the optical axis AX of the lens group 12, in excess of the biasing force of the leaf spring 150. As a result, a state is produced wherein the lens barrel 10 and the barrel holder 20 are pressed against the contact surface 42 of the base member 40 by the leaf spring 150 when no such external force is applied (a secured state). In addition, through the application of an external force from a direction that is perpendicular to the optical axis AX of the lens group 12, the lens barrel 10 and the barrel holder 20 can be moved in a state wherein the back end face 25 of the barrel holder 20 is in contact with the contact surface 42 of the base member 40.

Because the biasing force of the leaf spring 150 will be large when the difference between the height H5 of the bend portions in the bend portions 161 and 162 and the height H6 of the flange portion 15 of the lens barrel 10 is large, the force for moving the lens barrel 10 and the barrel holder 20 will be large. Consequently, the difference between the height H5 of the bend portion and the height H6 of the flange portion 15 preferably is adjusted so as to enable movement of the lens barrel 10 and the barrel holder 20, through producing, in the leaf spring 150, a biasing force that is adequate to press the lens barrel 10 and the barrel holder 20 against the base member 40.

A method for manufacturing the imaging device 200 will be explained next in reference to FIG. 4, FIG. 10B, and FIG. 11B.

As illustrated in FIG. 4 and FIG. 10B, a lens barrel 10 wherein a lens group 12 is secured to the inner peripheral surface of a cylindrical portion 11 is prepared. Here the axis CA of the lens barrel 10 and the optical axis AX of the lens group 12 are coincident. Moreover, a substrate 60, on which the imaging element 70 is mounted, a barrel holder 20, a leaf spring 150, screws 65 and 153, and adhesive agents 28 and 52 are prepared.

Next, the male threaded portion 14 of the lens barrel 10 our screwed into the female threaded portion 22 of the barrel holder 20, to provisionally secure the lens barrel 10 and the barrel holder 20 (a lens barrel provisional securing step).

Moreover, in a state wherein the positioning bosses 47 of the base member 40 are inserted into the positioning holes 62 of the substrate 60, screws 65 are passed through the through holes 61 of the substrate 60 and screwed into the screw holes 45 of the base member 40. The substrate 60 is secured to the base member 40 thereby (a substrate securing step).

The back end face 25 of the barrel holder 20 is next caused to contact the contact surface 42 of the base member 40. In this state, as illustrated in FIG. 11B, the bend portions 161 and 162 of the leaf spring 150 are caused to contact the front face 15a of the flange portion 15 of the lens barrel 10. Given this, the screws 153 are inserted through the screw holes 156 of the leaf spring 150, and the screws 153 are screwed into the screw holes 165 of the base member 40. The lens barrel 10, the barrel holder 20, and the base member 40 to which the substrate 60 is secured are integrated thereby (an assembly step).

Following this, the integrated lens barrel 10, barrel holder 20, and base member 40, is placed in a centering apparatus, not shown. The chuck grooves 26 of the barrel holder 20, which has provisionally secured the lens barrel 10, are grasped by a gripping member. Following this, the position of the barrel holder 20 (the position of the barrel holder 20 in the directions that are perpendicular to the optical axis AX of the lens group 12) is adjusted to a position wherein the center of the imaging element 70 and the optical axis AX of the lens group 12 are coincident, in the same manner as the method for manufacturing the imaging device 100 according to the previous example (a centering step).

Next, while the chart image is observed again, the lens barrel 10 is rotated to adjust the amount to which the lens barrel 10 is screwed into the barrel holder 20 in the same manner as the method for manufacturing the imaging device 100 according to the above examples, to adjust the focus (a focusing step).

After the focusing step, the lens barrel 10, barrel holder 20, and base member 40 that have been assembled by the leaf spring 150 is removed from a centering apparatus, not shown.

The adhesive agent 52 is injected between the side face 44 of the first opening portion 41 and the trunk portion 21 of the barrel holder 20, and then cured. In addition, the adhesive agent 28 is injected through the filling hole 27 of the barrel holder 20, between the lens barrel 10 and the barrel holder 20, and cured. The lens barrel 10 is secured to the barrel holder 20 and the barrel holder 20 is secured to the base member 40 thereby (a bonding step). The adhesive agents 52 and 28 are, for example, ultraviolet radiation curable adhesive agents, thermally curable adhesive agents, or the like.

The imaging device 200 is manufactured through the steps set forth above.

As described above, in the imaging device 200, as with the imaging device 100 of previous example, the back end face 25 of the barrel holder 20 is in contact with the contact surface 42 of the base member 40, enabling suppression of defocusing in the imaging device 200.

Moreover, the barrel holder 20 and the base member 40 are secured by the adhesive agent 52, and the outer peripheral surface of the barrel holder 20 and the side face 44 of the base member 40, which is continuous with the contact surface 42, are secured together, enabling further suppression of defocusing in the imaging device 200.

Furthermore, in the method for manufacturing the imaging device 200, as described above, as with the method for manufacturing the imaging device 100 in the previous example, the adhesive agent 52 does not incur between the back end face 25 of the barrel holder 20 and the contact surface 42 of the base member 40, and thus there is no tilting of the lens barrel 10 and the barrel holder 20, in respect to the direction that is perpendicular to the imaging element 70, that would be caused by expansion or contraction of the adhesive agent. There will also be no shift, from the prescribed position, of the position of the lens barrel 10 and the barrel holder 20 in the direction of the optical axis AX of the lens group 12 through expansion or contraction of the adhesive agent 52. As a result, the method for manufacturing the imaging device 200 can suppress defocusing in the imaging device 200.

Moreover, the position of the lens barrel 10 in the direction of the optical axis AX of the lens group 12 can be adjusted through adjusting the amount to which the lens barrel 10 is screwed into the barrel holder 20, through rotating the lens barrel 10, enabling the focus in the imaging device 200 to be adjusted easily.

In the centering step, the barrel holder 20 is moved in the directions that are perpendicular to the optical axis AX of the lens group 12 in a state wherein the back end face 25 of the barrel holder 20 is in contact with the contact surface 42 of the base member 40, enabling the position of the barrel holder 20 be adjusted easily in the directions that are perpendicular to the optical axis AX of the lens group 12.

Moreover, because of the barrel holder 20 is biased by the base member 40 toward the leaf spring 150, the gripping member that is used in the method for manufacturing the imaging device 200 need not bias the barrel holder 20 toward the base member 40. This enables the structure of the gripping member to be simplified.

In the imaging device 200 the lens barrel 10 and the barrel holder 20 are biased toward the base member 40 by the leaf spring 150, and thus the imaging device 200 enables a further suppression of defocusing.

That is, when the lens barrel 10 is biased toward the barrel holder 20 by a conical spring 16 that is disposed between the lens barrel 10 and the barrel holder 20, the conical spring 16 may be twisted by the rotation of the lens barrel 10 in the focusing step. If the conical spring 16 is twisted, the force of restitution of the twisting of the conical spring 16 after the focusing step will act on the lens barrel 10, changing the position of the lens barrel 10. Defocusing would occur as a result. On the other hand, in the imaging device 200, the leaf spring 150 biases the lens barrel 10 and the barrel holder 20 toward the base member 40, and thus no force that would change the position of the lens barrel 10 will act on the lens barrel 10 after the focusing step. The result is that the imaging device 200 is able to further suppress defocusing.

In the imaging device 200, the lens barrel 10, the barrel holder 20, and the base member 40 are all integrated into a single unit by the leaf spring 150. Consequently, the integrated lens barrel 10, the barrel holder 20, and the base member 40 can be removed from the centering apparatus prior to the bonding step. That is, in manufacturing of the imaging device 200, the bonding step can be carried out at other than the centering apparatus.

For example, because in the method for manufacturing the imaging device 100 the lens barrel 10, the barrel holder 20, and the base member 40 were not integrated into a single unit in the state wherein the centering step has been completed, the barrel holder 20 and the base member 40 are bonded in a state wherein the lens barrel 10, the barrel holder 20 and the base member 40 are in the centering apparatus (the barrel holder bonding step).

In contrast, in the method for manufacturing the imaging device 200, the bonding step can be carried out at other than the centering apparatus.

The method for manufacturing wherein the bonding step is carried out at other than the centering apparatus is able to shorten the tact time of the centering step to be shorter than that in a manufacturing method wherein the centering step and the bonding step are carried out in the centering apparatus. This results in the ability to reduce the manufacturing cost of the imaging device 200.

In the imaging device 200, the bend portions 161 and 162 of the leaf spring 150 contact the front face 15a of the flange portion 15 of the lens barrel 10 from the object side of the lens group 12, and thus in the centering step the lens barrel 10 and the barrel holder 20 can be moved easily in the directions perpendicular to the optical axis AX of the lens group 12.

Figure 12A:
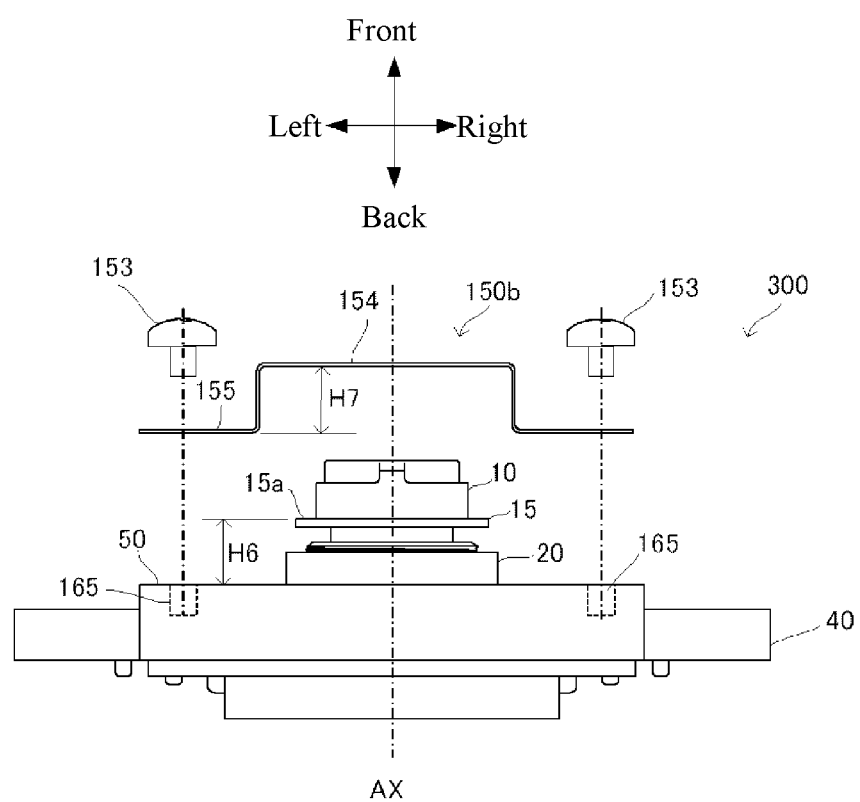
FIG. 12A is a schematic diagram for explaining a leaf spring of an imaging device according to a reference example.

An imaging device 300 that comprises a leaf spring 150b that does not have the bend portions 161 and 162, as illustrated in FIG. 12A, will be explained as a reference example.

The height H7 from the bottom face of the center portion 154 of the leaf spring 150b to the bottom face of the side portion 155 (the height of the center portion) is set so as to be less than the height H6 of the flange portion 15 (H7<H6), so as to enable the lens barrel 10 and the barrel holder 20 to be biased toward the base member 40 by the leaf spring 150b.

Figure 12B:
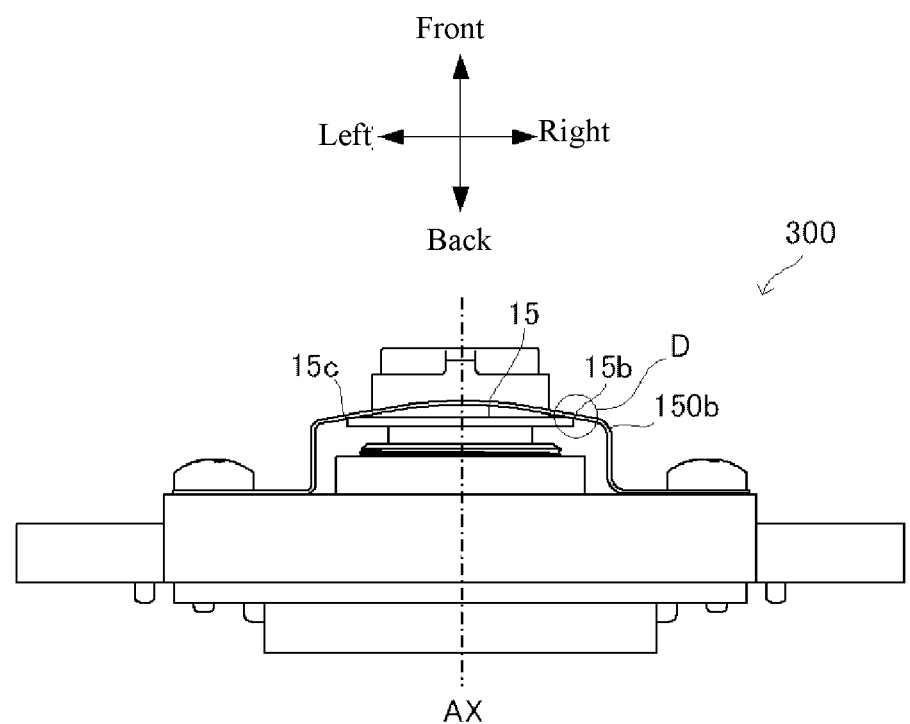
FIG. 12B is a bottom view of an imaging device according to a reference example.

Because the height H7 of the center portion 154 is less than the height H6 of the flange portion 15, the leaf spring 150b that is secured to the base member 40 will bend in the center portion 154 to contact the end portions 15b of the flange portion 15 of the lens barrel 10, as illustrated in FIG. 12B.

Figure 12C:
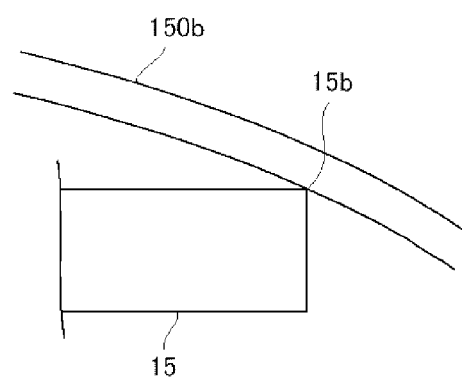
FIG. 12C is an enlarged view of the D portion of the imaging device according to the reference example depicted in FIG. 12B.

More specifically, the center portion 154 of the leaf spring 150b is bent, as illustrated in FIG. 12C, and thus the center portion 154 of the leaf spring 150b contacts an end portion 15b of the flange portion 15 from a direction that is angled in respect to the optical axis AX of the lens group 12. As a result, the center portion 154 of the leaf spring 150b biases the lens barrel 10 and the barrel holder 20, in relation to the base member 40, from a direction that is at an angle in respect to the optical axis AX of the lens group 12.

In this case, the biasing force of the leaf spring 150b acts also in a direction that is perpendicular to the optical axis AX of the lens group 12, and thus a large force must be applied to the lens barrel 10 and the barrel holder 20 in order to move the lens barrel 10 and the barrel holder 20 in the directions that are perpendicular to the optical axis AX of the lens group 12. That is, in the centering step for manufacturing the imaging device 300, a large force must be applied to the lens barrel 10 and the barrel holder 20.

In contrast, with the imaging device 200, the center portion 154 of the leaf spring 150 has bend portions 161 and 162, which can prevent the center portion 154 of the leaf spring 150 from contacting the end portions 15b and 15c of the flange portion 15 from a direction that is angled in respect to the optical axis AX of the lens group 12. The result is that, in the imaging device 200, the bend portions 161 and 162 of the leaf spring 150 contact the front face 15a of the flange portion 15 from the object side of the lens group 12, and thus the lens barrel 10 and the barrel holder 20 are able to move easily in the centering step.

That is, in order to prevent the center portion 154 of the leaf spring 150 from bending and contacting the end portions 15b and 15c of the flange portion 15 at an angles in respect to the optical axis AX of the lens group 12, preferably the leaf spring 150 contacts a portion of the flange portion 15 from the object side of the lens group 12. Moreover, the part contacted by the leaf spring 150 should be a portion of the lens barrel 10. Moreover, the lens barrel 10 and the barrel holder 20 can be biased, in respect to the base member 40, uniformly through the leaf spring 150 contacting a plurality of parts of the lens barrel 10 uniformly.

In yet another example, the bend portions 161 and 162 of the leaf spring 150 bend toward the image side of the lens group 12. In addition, the bend portions 161 and 162 of the leaf spring 150 contact the front face 15a of the flange portion 15 of the lens barrel 10 linearly.

The shapes of the bend portions 161 and 162 of the leaf spring 150 are arbitrary. When the leaf spring 150 is secured to the base member 40, the leaf spring 150 must contact the end portions 15b and 15c of the flange portion 15 from a direction that is at an angle in respect to the optical axis AX of the lens group 12. Moreover, the leaf spring 150 should be able to bias the lens barrel 10 and the barrel holder 20 in the direction of the optical axis AX of the lens group 12.

Figure 13A:
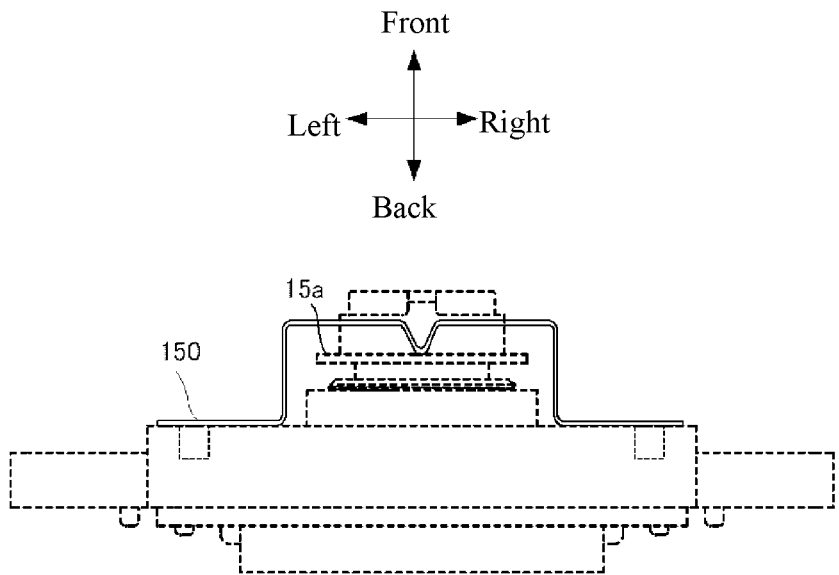
FIG. 13A is a schematic diagram depicting an imaging device according to an alternate example according to the present invention.
Figure 13B:
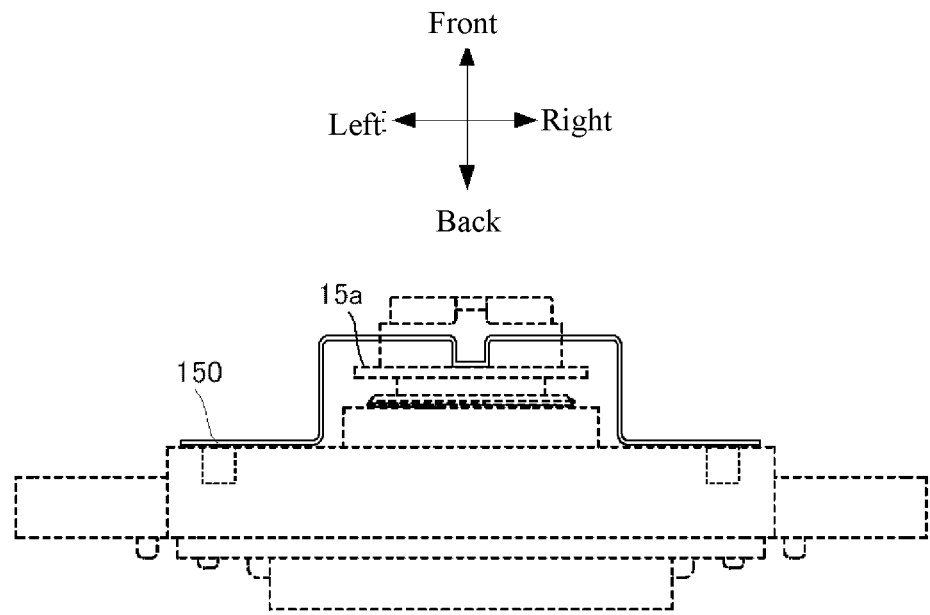
FIG. 13B is a schematic diagram depicting an imaging device according to an alternate example according to the present invention.
Figure 13C:
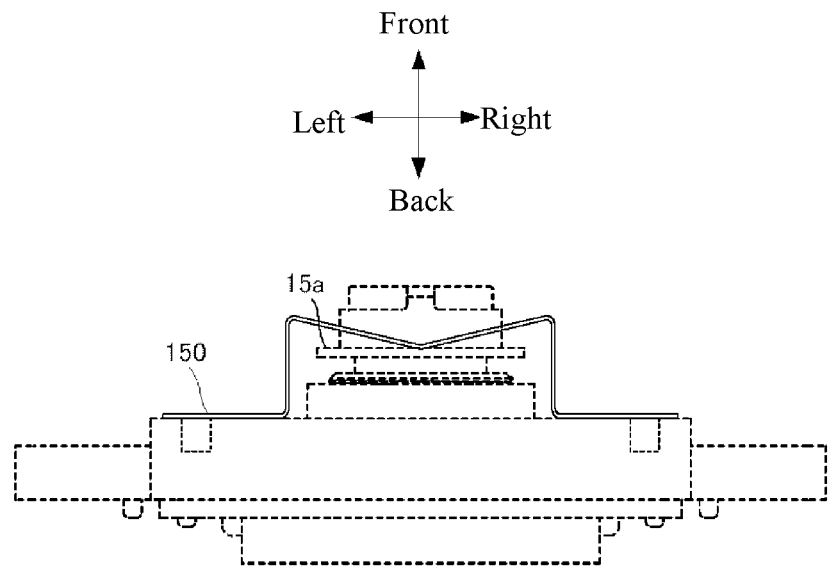
FIG. 13C is a schematic diagram depicting an imaging device according to an alternate example according to the present invention.

For example, the bend portions 161 and 162 of the leaf spring 150 may be bent in V shapes, as illustrated in FIG. 13A. Moreover, the bend portions 161 and 162 of the leaf spring 150 may be bent in square shapes, as illustrated in FIG. 13B, or the surfaces of the bend portions 161 and 162 of the leaf spring 150 may contact the front face 15a of the flange portion 15 of the lens barrel 10. Moreover, as illustrated in FIG. 13C, the leaf spring 150 may instead be bent at the center of the center portion 154 to contact the front face 15a of the flange portion 15 at the center of the center portion 154.

Figure 13D:
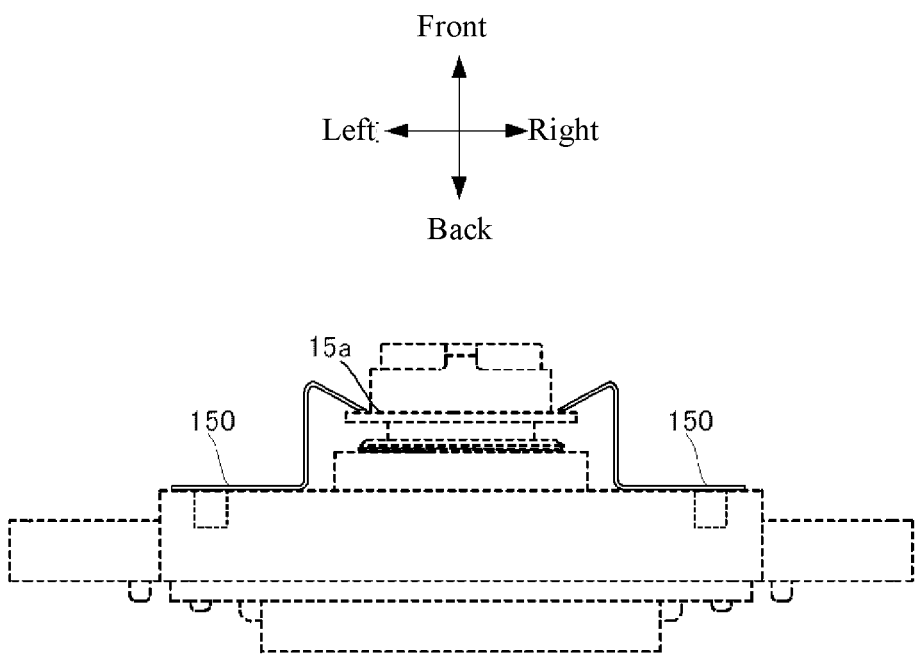
FIG. 13D is a schematic diagram depicting an imaging device according to an alternate example according to the present invention.

Moreover, the leaf spring 150 may be structured from a plurality of members. For example, as illustrated in FIG. 13D, the leaf spring 150 may be structured from two leaf springs.

The number of bend portions 161 and 162 of the leaf spring 150 is arbitrary. Note that the bend portions of the leaf spring 150 preferably are arranged uniformly in the leaf spring 150. That is, the bend portions of the leaf spring 150 preferably are arranged so as to contact the front face 15a of the flange portion 15 of the lens barrel 10 at uniformly spaced positions. For example, three bend portions may be arranged at 120° intervals at the center portion 154 of the leaf spring 150. Moreover, the leaf spring 150 may be structured from three leaf springs, where the three leaf springs 150 may be arranged at 120° intervals. This enables the leaf spring(s) 150 to bias the lens barrel 10 and the barrel holder 20 uniformly toward the base member 40.

The leaf spring 150 should contact a part for biasing the lens barrel 10 and the barrel holder 20 in respect to the base member 40. For example, the leaf spring 150 may contact a step, a recessed portion, a protrusion, or the like, that is formed on the cylindrical portion 11 of the lens barrel 10 from the object side of the lens group 12.

An imaging device 500 according to the present invention includes a lens holding member 501, a pressing member 502, a base member 503, a substrate 504, and a coil spring 505, as illustrated in FIG. 14, FIG. 15A through FIG. 15C, and FIG. 16.

The lens holding member 501, pressing member 502, and base member 503 is made from a resin material, a metal material (such as aluminum), or the like. The resin material used in these may be, for example, polycarbonate (PC), polymethyl methacrylate (PMMA), polyethylene, polypropylene, polyvinyl chloride, polystyrene, acrylonitrile-butadiene, -styrene (ABS), polyamide resin (PA), or the like.

The lens holding member 501 holds a lens group 506 made from at least one lens that has an optical axis AX, The lens holding member 501 holds the lens group 506 so that the lens group 506 does not come out of the lens holding member 501 when there is a physical shock, or the like, from the outside.

Figure 14:
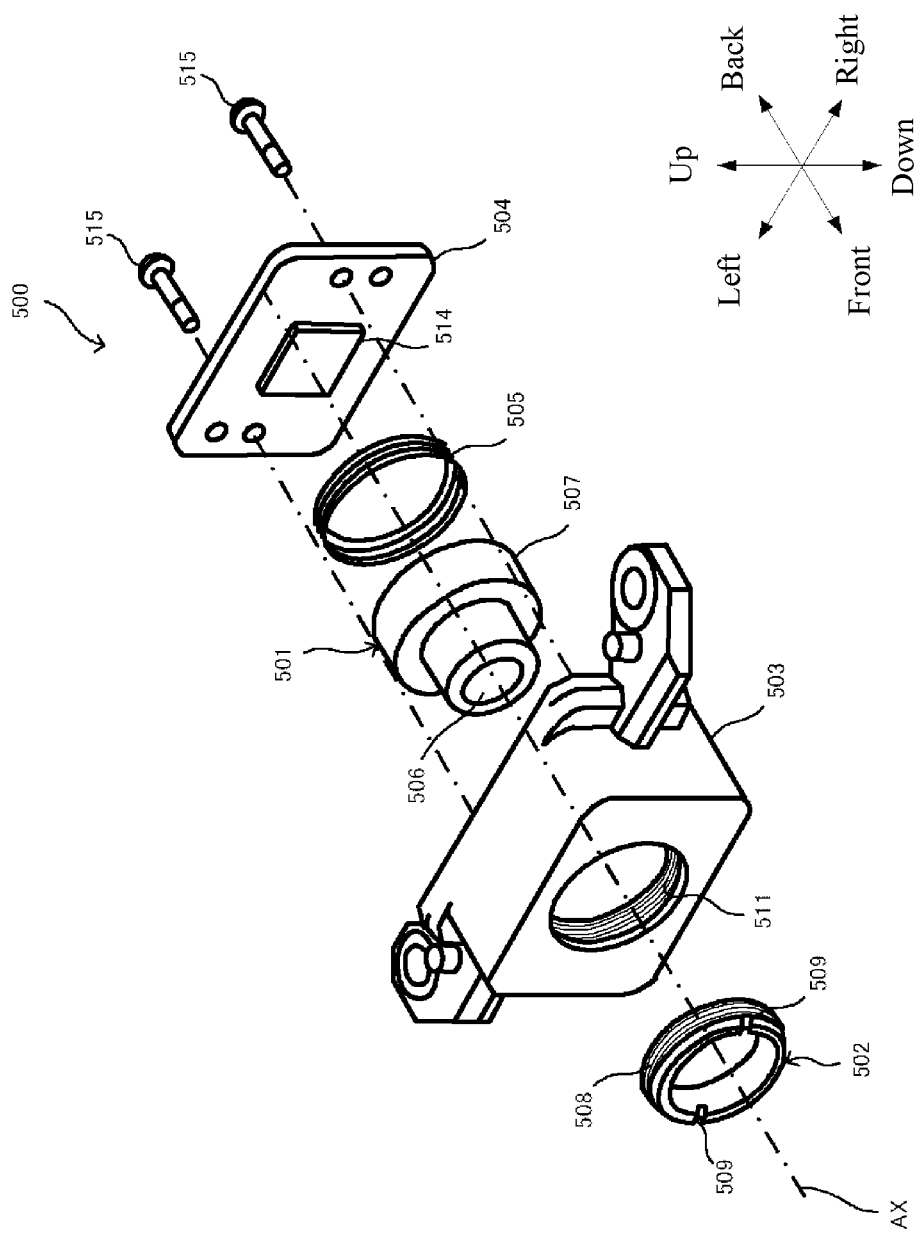
FIG. 14 is an exploded perspective diagram of an imaging device according to an example according to the present invention.
Figure 15A:
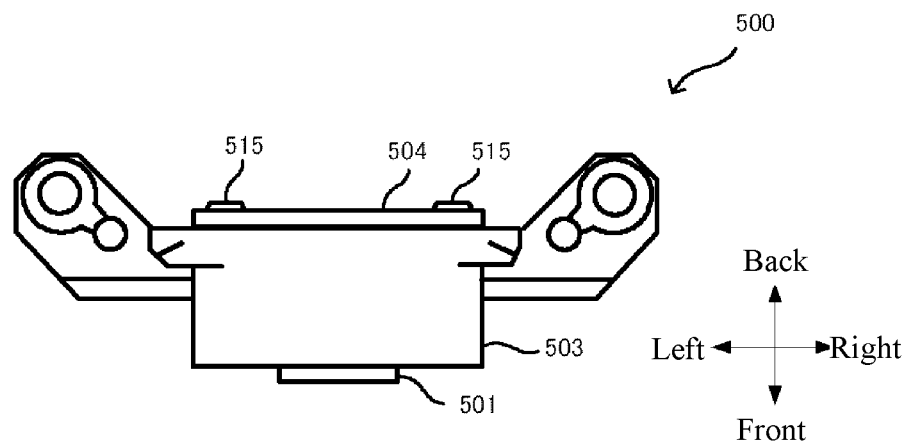
FIG. 15A is a top view of an imaging device according to the example according to the present invention.
Figure 15B:
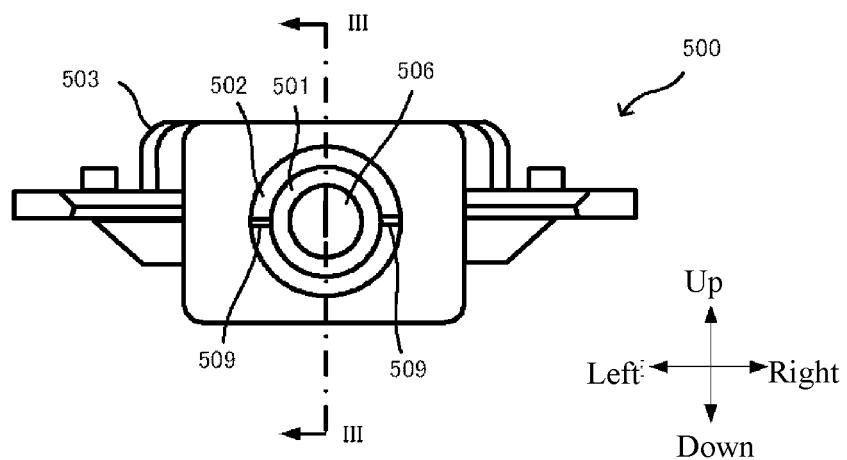
FIG. 15B is a front view of an imaging device according to the example according to the present invention.
Figure 15C:
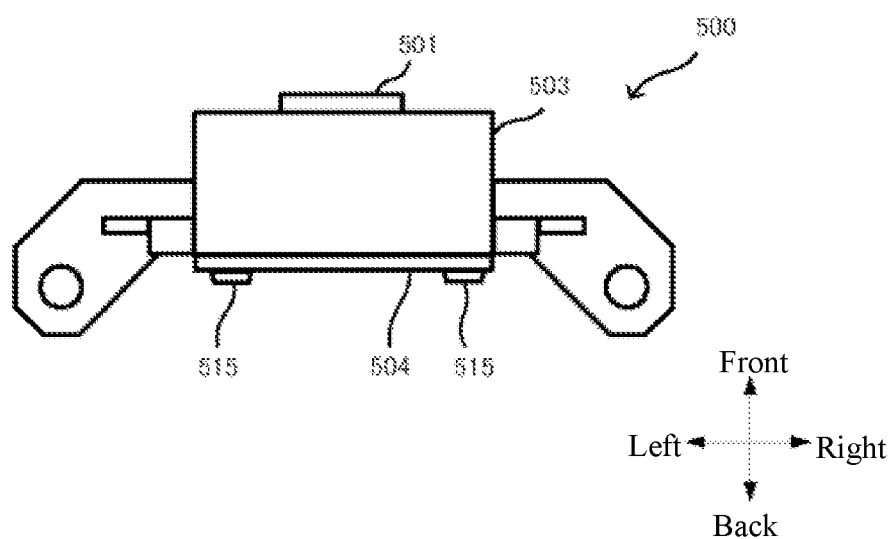
FIG. 15C is a bottom view of an imaging device according to the example according to the present invention.

The outside shape of the lens holding member 501 is a shape that combines two circular columns centered on the optical axis AX of the lens group 506, as illustrated in FIG. 14. The outer diameter of the rearward circular column in the lens holding member 501 is larger than the outer diameter of the forward circular column in the lens holding member 501. Moreover, the rearward circular column in the lens holding member 501 serves as a first fitting portion 507 that fits with the base member 503.

Note that the outside shape of the lens holding member 501 may be a circular column shape, a polygonal column shape, or the like.

If the lens member 506 is to be secured in the lens holding member 501 through heat caulking, then preferably the lens holding member 501 is made from a resin material that is suitable for heat caulking.

The pressing member 502 is a ring-shaped member, as illustrated in FIG. 14. A third screw-fastening portion 508 that has a helical groove is provided on the outer peripheral surface of the pressing member 502. Moreover, a fixture attaching portion 509 is attached to the pressing member 502. The fixture attaching portion 509 is a groove that is provided in front of the pressing member 502. A fixture for rotating the pressing member 502, in respect to the base member 503, is attached, to the fixture attaching portion 509, centered on the optical axis AX of the lens group 506.

The pressing member 502 constrains the movement of the lens holding member 501 in the direction of the biasing by the coil spring 505 (that is, forward) through contacting the lens holding member 501 from the front (the object side of the lens group 506).

Figure 16:
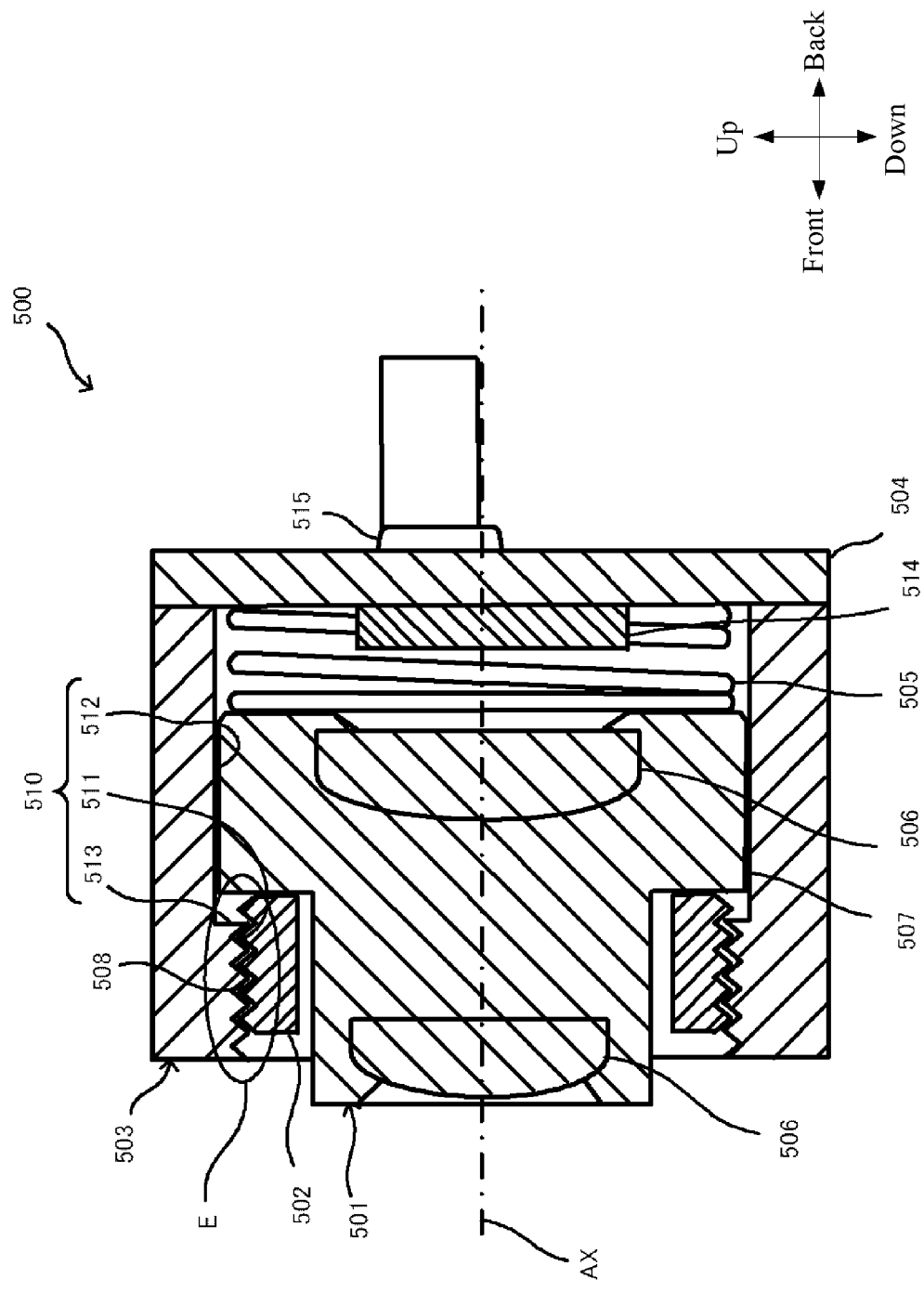
FIG. 16 is a cross-sectional view along the section III-III in the imaging device depicted in FIG. 15B.

The base member 503 has a through hole portion 510 wherein a through hole is formed along the optical axis AX of the lens group 506, as illustrated in FIG. 16. The through hole portion 510 is a hole for containing the lens holding member 501 in the interior thereof.

A fourth screw-fastening portion 511 that has a helical groove, and a second fitting portion 512 of the base member 503, are provided in the through hole portion 510 of the base member 503. The fourth screw-fastening portion 511 of the base member 503 screws together with the third screw-fastening portion 508 of the pressing member 502. The second fitting portion 512 of the base member 503 fits with the first fitting portion 107 of the lens holding member 501. The second fitting portion 512 of the base member 503 and the fourth screw-fastening portion 511 are connected by a stepped portion 513. Moreover, when viewed from the front, the outer diameter of the first fitting portion 507 of the lens holding member 501 is larger than the inner diameter of the fourth screw-fastening portion 511 of the base member 503.

The second fitting portion 512 of the base member 503 may have a shape that fits with the first fitting portion 507 of the lens holding member 501. When viewed from the front, the first fitting portion 507 of the lens holding member 501 has a circular shape, and thus the second fitting portion 512 of the base member 503 is also a circular shape that has a size that fits together with the first fitting portion 507 of the lens holding member 501. The second fitting portion 512 of the base member 503 and the first fitting portion 507 of the lens holding member 501 fit together, and so the through hole portion 510 of the base member 503 fits together with the lens holding member 501 between the fourth screw-fastening portion 511 of the base member 503 and the substrate 504.

In the substrate 504, the imaging element 514 is on the front face. The imaging element 514 has, on the front face thereof, an imaging surface whereon an image is focused through a lens group 506. In the substrate 504, the imaging element 514 is secured at a position lined up with the lens group 506, along the optical axis AX of the lens group 506. Specifically, the substrate 504 is secured by screws 515 to the base member 503 at a position such that the optical axis AX of the lens group 506 passes through the center of the imaging surface of the imaging element 514. Note that the method for securing the substrate 504 to the base member 503 is not limited to securing using screws, but rather the substrate 504 and the base member 503 may be secured together through an adhesive agent.

Figure 17:
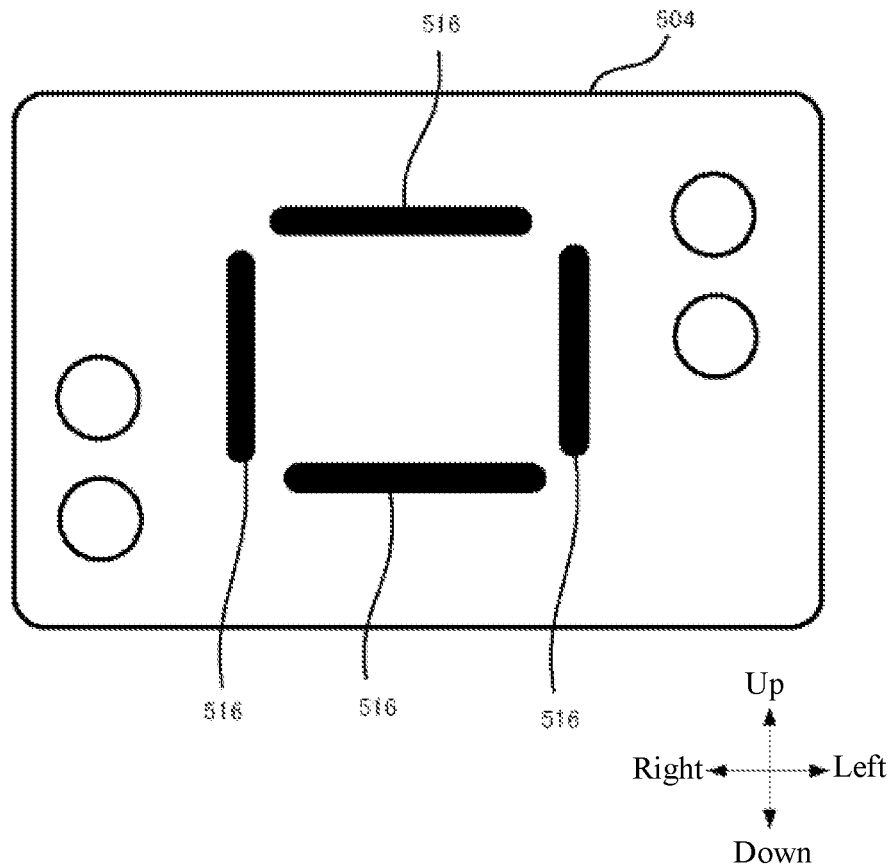
FIG. 17 is a back view of a substrate related to the example according to the present invention.
Figure 18:
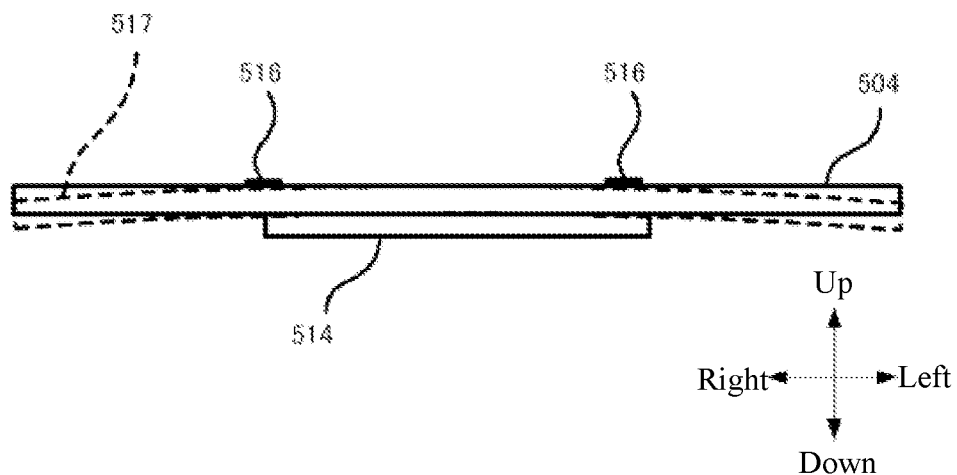
FIG. 18 is a schematic diagram for explaining warping of the substrate related to the example according to the present invention.

Generally the imaging element 514 is mounted on the substrate 504 using solder. As a result, if no strengthening member were provided on the substrate 504, then the substrate 504 would warp with heat. For example, as illustrated by the dotted line 517 of FIG. 18, the substrate 504 warps in the direction of the imaging element 514. Given this, as illustrated in FIG. 17 and FIG. 18, the warping of the substrate 504 can be suppressed through coating solder 516 onto the back face of the substrate 504.

Note that imaging element 514 is structured from a CCD (Charge Coupled Device) imaging sensor or a CMOS (Complementary Metal Oxide Semiconductor) imaging sensor, or the like. The imaging element 514 may be provided with a cover glass, and the like.

The coil spring 505 is a biasing member for biasing the lens holding member 501 toward the front in respect to the substrate 504. For example, as illustrated in FIG. 16, the coil spring 505 is disposed in a through hole portion 510. The use of the coil spring 505 as the biasing member makes it possible to form a space between the lens group 506 and the imaging element 514 through a simple structure, without blocking the light that is incident from the lens group 506 into the imaging element 514.

In the present invention, the lens holding member 501 and the coil spring 505 are attached, sequentially from the rear, to the through hole portion 510 of the base member 503. Given this, the substrate 504 is secured to the base member 503 from the rear of the coil spring 505. Lastly, the imaging device 500 is assembled through the pressing member 502 being attached to the base member 503 from the front.

The pressing member 502 is attached to the base member 503 by screwing the third screw-fastening portion 508 to the fourth screw-fastening portion 511 of the base member 503. The screwing structure (the structure that is fitted together through threaded grooves) is not limited to that of the third screw-fastening portion 508 of the pressing member 502 and the fourth screw-fastening portion 511 of the base member 503. For example, the third screw-fastening portion 508 and the fourth screw-fastening portion 511 may instead be of a cam ring structure (a structure that fits together through a threaded groove and a protrusion). That is, in the present application, "screwing together" is not limited to fitting together through a screwing action, but includes also fitting together through a cam ring.

The pressing member 502 contacts the lens holding member 501 from the image side (the front) of the lens group 506. As a result, the distance between the lens group 506 of the lens holding member 501 and the imaging surface of the imaging element 514 (the position of the lens holding member 501 in the direction of the optical axis AX of the lens group 506) can be adjusted through rotating the pressing member 502 in respect to the base member 503 in order to adjust the amount to which it moves to the rear (the amount to which the pressing member 502 is screwed into the base member 503). This enables the focus of the imaging device 500 to be adjusted.

Moreover, the lens holding member 501 is biased toward the front from the back by the coil spring 505 wherein the back end contacts the substrate 504, and thus the pressing member 502 is biased toward the front through the lens holding member 501. That is, the third screw-fastening portion 508 of the pressing member 502 is pressed in the direction of the optical axis AX of the lens group 506 (toward the front) by the coil spring 505 through the lens holding member 501. Consequently, the third screw-fastening portion 508 of the pressing member 502 and the fourth screw-fastening portion 511 of the base member 503 are pressed, by the biasing force of the coil spring 505, so as to make contact.

Through this, the frictional force between the third screw-fastening portion 508 of the pressing member 502 and the fourth screw-fastening portion 511 of the base member 503 will be greater than in a case wherein there is no biasing force of the coil spring 505. The result is that the position of the lens holding member 501 in the base member 503 will not shift after the imaging device 500 has been focused.

Consequently, the imaging device 500 can be assembled without securing the lens holding member 501 to the base member 503 through an adhesive agent, or the like. Moreover, the focus of the imaging device 500 can be adjusted easily during assembly of the imaging device 500.

Figure 19:
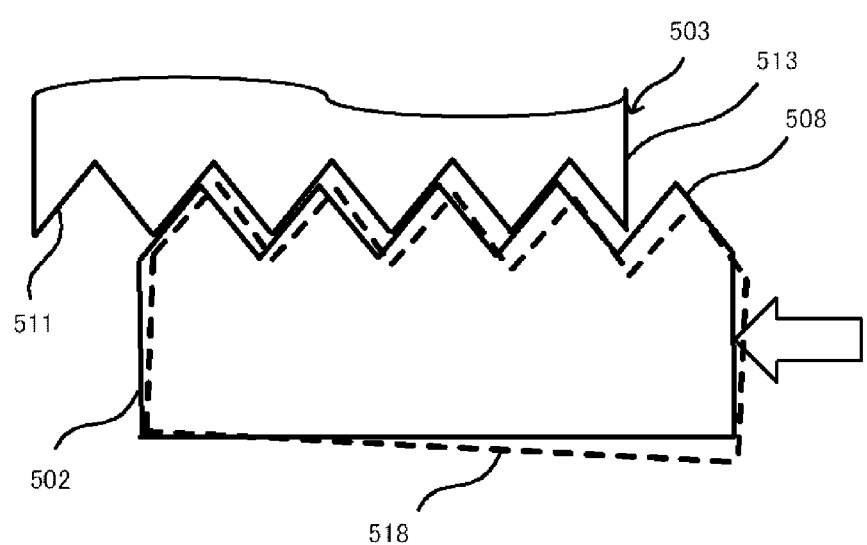
FIG. 19 is an enlarged view of the E portion depicted in FIG. 16.

Moreover, because, as indicated by the dotted line 518 in FIG. 19, the third screw-fastening portion 508 of the pressing member 502 and the fourth screw-fastening portion 511 of the base member 503 are screwed together, and so generally there will be a gap between the two. Consequently, if no coil spring 505 were provided, then the angle of the optical axis AX of the lens group 506 in respect to the imaging surface of the imaging element 514 would deviate from the design value (of, for example, 90°). In the present example, a coil spring 505 is provided, and thus, as indicated by the solid line in FIG. 19, the third screw-fastening portion 508 of the pressing member 502 and the fourth screw-fastening portion 511 of the base member 503 make contact through being pressed by the biasing force of the coil spring 505. This makes it easy to preserve the angle of the optical axis AX of the lens group 506, in respect to the imaging surface of the imaging element 514, at the design value or a state that is near to the design value.

Note that FIG. 19 is an enlarged view of the E portion of FIG. 16. Moreover, in FIG. 19, the gap between the third screw-fastening portion 508 and the fourth screw-fastening portion 511 is shown in a proportion that is larger than it is in reality.

Moreover, generally in a state wherein the lens group 506 is held in the lens holding member 501, the lens characteristics are such that resolution is not the same in the vertical and crosswise directions. In the present invention, the pressing member 502 and the lens holding member 501 are structured by other members, so the lens holding member 501 is not rotated when adjusting the focus of the imaging device 500. Consequently, the characteristics of the lens group 506 that is held in the lens holding member 501 will not be changed. This makes it possible to maintain, even in the imaging device 500, the desired state immediately after the lens group 506 is held in the lens holding member 501, after the imaging device 500 has been assembled.

As described above, the angle of the optical axis AX of the lens group 506, in respect to the imaging surface of the imaging element 514, and the characteristics of the lens group 506, can be maintained at the design values or in a state that is near to the design values. The result is that this enables the imaging device 500 to capture high quality images.

In the present example, as described above, the through hole portion 510 of the base member 503 fits together with the lens holding member 50 between the fourth screw-fastening portion 511 of the base member 503 and the substrate 504. This enables the positions of the lens holding member 501 in the vertical and crosswise direction to be secured in respect to the base member 503.

Moreover, because the first fitting portion 507 of the lens holding member 501 and the second fitting portion 512 of the base member 503 have corner portions that fit together, when viewed from the front, the rotation of the lens holding member 501 is prevented. This enables prevention of variation in the characteristics of the lens group 506. The result is that this enables the imaging device 500 to capture high quality images.

Figure 20:
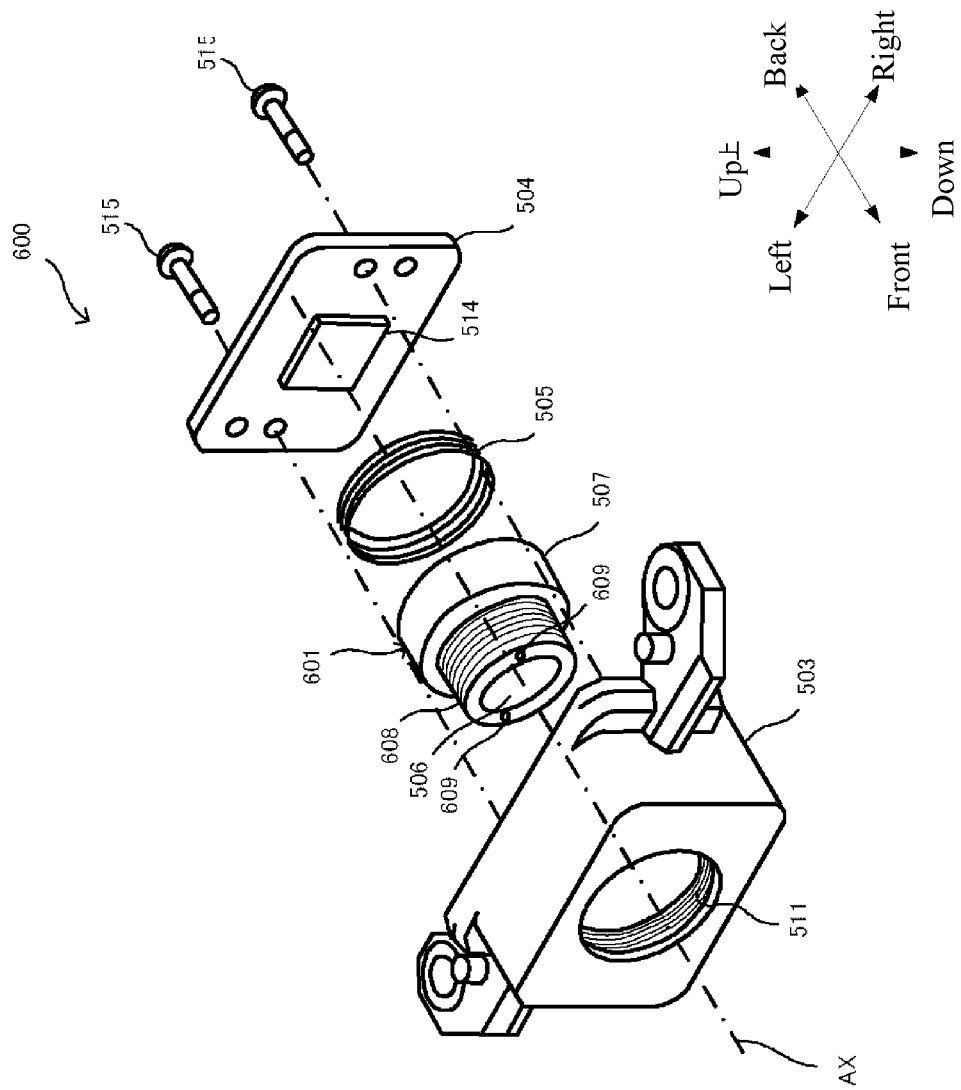
FIG. 20 is an exploded perspective diagram of an imaging device according to another example according to the present invention.
Figure 21:
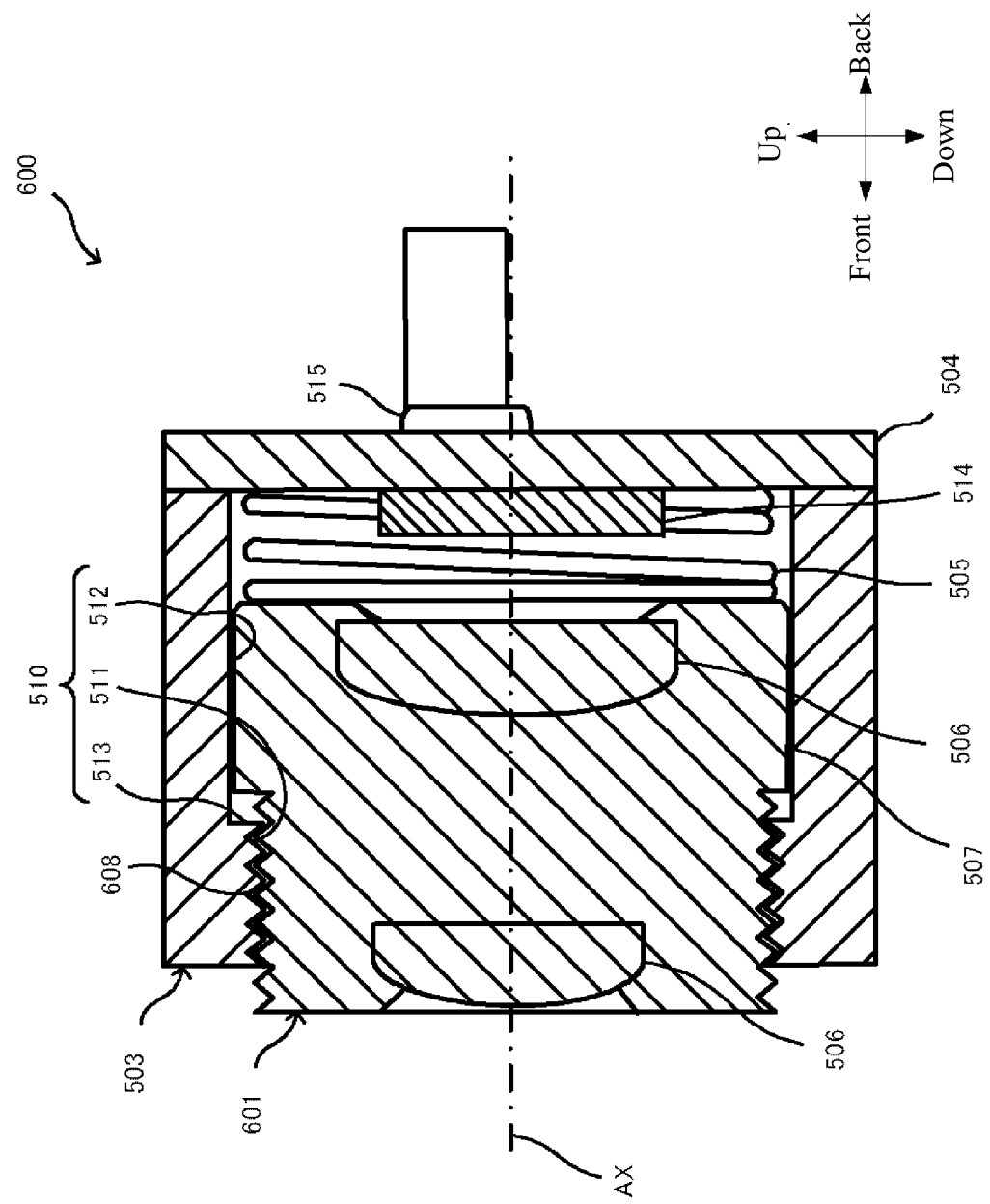
FIG. 21 is a cross-sectional view of an imaging device according to the example according to the present invention.

The imaging device 600 according to the present invention is not provided with the pressing member 502 of the imaging device 500 according to the previous example, as illustrated in FIG. 20 and FIG. 21. Moreover, the imaging device 600 is provided with a lens holding member 601, instead of the lens holding member 501 that is equipped in the imaging device 500 according to the previous example. Aside from these, the imaging device 600 is provided with essentially the same structure as the imaging device 500 according to the above example.

The lens holding member 601, as illustrated in FIG. 20, has a third screw-fastening portion 608 that has a helical groove. Moreover, the lens holding member 601 has an outer peripheral surface of a cylindrical body shape that is centered on the optical axis AX of the lens group 506.

Moreover, a fixture attaching portion 609 is provided in the lens holding member 601. The fixture attaching portion 609 is a recessed portion that is provided to the front of the lens holding member 601. A fixture for rotating the lens holding member 601, in respect to the base member 503, is attached, to the fixture attaching portion 609, after the substrate 504 has been secured to the base member 503.

In the present invention, the lens holding member 501 and the coil spring 505 are attached, sequentially from the rear, to the through hole portion 510 of the base member 503. Given this, the substrate 504 is secured to the base member 503 from the rear of the coil spring 505. The imaging device 600 can be assembled thereby. As a result, the imaging device 600 can be assembled more easily than the imaging device 500 according to the above example.

The lens holding member 601 is attached to the base member 503 by screwing the third screw-fastening portion 608 to the fourth screw-fastening portion 511 of the base member 503. The third screw-fastening portion 608 of the lens holding member 601 and the fourth screw-fastening portion 511 of the base member 503, as with third screw-fastening portion 508 and the fourth screw-fastening portion 511, are not limited to a screwing structure, but rather may have a cam ring structure, or the like.

The distance between the lens group 506 and the imaging surface of the imaging element 514 (the position of the lens holding member 601 in the direction of the optical axis AX of the lens group 506) can be adjusted through rotating the lens holding member 601 in respect to the base member 503 in order to adjust the amount to which it moves to the front (the amount to which the lens holding member 601 is screwed into the base member 503). This enables the focus of the imaging device 600 to be adjusted.

Moreover, the lens holding member 601 is biased toward the front from the back by the coil spring 505 wherein the back end contacts the substrate 504. That is, the third screw-fastening portion 608 of the lens holding member 601 is pressed in the direction of the optical axis AX of the lens group 506 (toward the front) by the coil spring 505 through the lens holding member 601. Consequently, the third screw-fastening portion 608 of the lens holding member 602 and the fourth screw-fastening portion 511 of the base member 503 are pressed, by the biasing force of the coil spring 505, so as to make contact.

Through this, in the same manner as in the above example, the frictional force between the third screw-fastening portion 608 of the lens holding member 602 and the fourth screw-fastening portion 511 of the base member 503 will be greater than in a case where there is no biasing force from the coil spring 505. The result is that the position of the lens holding member 601 in the base member 503 will not shift after the imaging device 600 has been focused.

Consequently, as with the above example, the imaging device 600 can be assembled without securing the lens holding member 601 to the base member 503 through an adhesive agent, or the like. Moreover, the focus of the imaging device 600 can be adjusted easily during assembly of the imaging device 600.

Moreover, in the present example, a coil spring 505 is provided, and thus, as explained in reference to FIG. 6 in the above example, the third screw-fastening portion 608 of the lens holding member 601 and the fourth screw-fastening portion 511 of the base member 503 make contact through being pressed by the biasing force of the coil spring 505. This makes it easy to preserve the angle of the optical axis AX of the lens group 506, in respect to the imaging surface of the imaging element 514, at the design value or a state that is near to the design value.

As described above the angle of the optical axis AX of the lens group 506, in respect to the imaging surface of the imaging element 514, can be maintained at the design value or a state that is near to the design value. The result is that this enables the imaging device 600 to capture high quality images.

In the present example, as with the previous example, the through hole portion 510 of the base member 503 fits together with the lens holding member 601 between the fourth screw-fastening portion 511 of the base member 503 and the substrate 504. This enables the positions of the lens holding member 601 in the vertical and crosswise direction to be secured in respect to the base member 503.

A portion or all of the examples described above, can be described also as in the supplementary notes below, but there is no limitation to that which is below.

An imaging device, comprising:

a lens holding member for holding at least one lens;

a ring-shaped pressing member having a third screw-fastening portion provided on an outer peripheral surface thereof;

a base member, contained within the lens holding member, having a through hole portion wherein a through hole is formed along the optical axis of the lens;

a fourth screw-fastening portion, provided in the through hole portion, for screwing together with the third screw-fastening portion of the pressing member;

a substrate that has an imaging element, wherein the imaging element is secured to the base member at a position that is aligned with the lens along the optical axis of the lens; and a fourth biasing member for biasing the lens holding member in respect to the substrate, wherein:

the pressing member contacting the lens holding member causes the lens holding member to move in the direction of biasing by the fourth biasing member.

An imaging device as set forth in Supplementary Note 1, wherein:

the through hole portion of the base member fits together with the lens holding member between the fourth screw-fastening portion and the substrate.

An imaging device, comprising:

a lens holding member for holding at least one lens, having a third screw-fastening portion provided on an outer peripheral surface that forms a cylindrical body shape that is centered on the optical axis of the lens;

a base member, contained within the lens holding member, having a through hole portion wherein a through hole is formed along the optical axis of the lens;

a fourth screw-fastening portion, provided in the through hole portion, for screwing together with the third screw-fastening portion of the lens holding member;

a substrate that to which an imaging element is attached, wherein the imaging element is secured to the base member at a position that is aligned with the lens along the optical axis of the lens; and a fourth biasing member for biasing the lens holding member in respect to the substrate.

An imaging device as set forth in any one of Supplementary Note 1 through 3, wherein:

the fourth biasing member is a coil spring that is disposed in the through hole portion of the base member.

An optical device comprising an imaging device as set forth in any one of Supplementary Notes 1 through 4.

An electronic device comprising an imaging device as set forth in any one of Supplementary Notes 1 through 4.

In the inventions described in the supplementary notes, when the third screw-fastening portion has a pressing member, the pressing member and the lens holding member are in contact, and thus the focus of the imaging device can be adjusted by adjusting the position of the lens through rotating the pressing member. Moreover, when the lens holding member has a third screw-fastening portion, the focus of the imaging device can be adjusted by adjusting the lens position through rotating the lens holding member.

In any event, the third screw-fastening portion is pressed in the optical axial direction of the lens by the fourth biasing member through the lens holding member, and thus the third screw-fastening portion and the fourth screw-fastening portion are pressed by the biasing force of the biasing member to make contact. Because of this, the frictional force between the third screw-fastening portion and the fourth screw-fastening portion will be large. The result will be that the position of the lens holding member will not change, after focusing of the imaging device, even if the lens holding member is not secured to the base portion through an adhesive agent, or the like. That is, this enables prevention of defocusing in the imaging device.

The result is that the focus of the imaging device can be adjusted easily during assembly of the imaging device.

Although a plurality of example according to the present invention have been explained above, the present invention is not limited to these example, but rather may be varied in a variety of ways within a range that does not deviate from the spirit or intent of the present invention.

For example, in the imaging device according to the present invention, the lens holding member may be provided with members for preventing ghosting in the images that are captured. Moreover, in the imaging device according to the present invention, the lens holding member may be provided with a member for compensating for the cumulative tolerance error of the lens group in the direction of the optical axis AX (for adjusting the thickness of the lenses themselves in the optical axial direction), a waterproofing member, or an IR (infrared)-cutting filter.

The lenses that structure the lens group may be of arbitrary lens materials and shapes, insofar as they satisfy the desired physical properties (for example, refractive index, Abbe number, partial dispersion ratio, coefficient of linear expansion, and the like), durability, and so forth.

Moreover, the lens surfaces of the lenses may be spherical surfaces, flat, or aspherical surfaces. If the lens surfaces are spherical surfaces or flat, the lens processing and assembly adjustments will be easy. Consequently, this can prevent variability in the optical performance due to tolerance errors in lens processing and assembly adjustments. When the lens surfaces are aspherical surfaces, the aspherical surfaces may be aspherical surfaces through polishing processes, glass-molded aspherical surfaces wherein glass is formed into an aspherical surface shape by a mold, or complex-shaped aspherical surfaces wherein resin on the surface of glass is formed into an aspherical surface shape. The surfaces of the lenses may be diffraction surfaces. Moreover, the lenses may instead be lenses of a gradient refractive index type (GRIN lenses), or plastic lenses.

Moreover, various processes may be performed on the surfaces of the lenses. For example, hydrophilization may be performed using a photocatalyst on the lens surface so as to prevent fogging of the lenses and the formation of water droplets.

The imaging device of the present invention is a device for capturing an image of an imaging subject. The imaging device according to the present invention may be used in, for example, an optical device, an electronic device, or the like. The optical device may be, for example, a consumer camera such as a digital camera, a vehicle-mounted camera, a monitoring camera, a camera for a medical treatment that is installed in, for example, an endoscope, a camcorder (a movie camera) for capturing video, an inspection camera, a camera for a robot, or the like. The electronic device may be, for example, a mobile telephone, a smart phone, a tablet terminal, a personal computer, or the like.

The present invention can have a variety of examples or modifications that do not deviate from the scope of the spirit of the broad definition of the present invention. Moreover, the examples set forth above are to explain this invention, and do not limit the scope of the present invention. That is, the scope of the present invention is defined by the patent claims, not by the examples. Given this, various modifications that are within the patent claims, or within the scope of the broad meaning of the inventions that are equivalent thereto, are viewed as being within the scope of the invention.

The invention claimed is:

1. An imaging device comprising:
a lens holding member holding at least one lens;
a base member holding the lens holding member;
a substrate, secured to the base member, that has an imaging element;
a screw-fastening member in contact with the base member, wherein the lens holding member is movable in a direction of an optical axis of the lens by rotating the screw-fastening member with respect to the base member; and
a biasing member configured to bias the lens holding member away from the substrate,
wherein the lens holding member is biased in a direction away from the substrate,
wherein the screw-fastening member includes a pressing member having a first screw-fastening portion,
wherein the base member has a second screw-fastening portion,
wherein the pressing member is biased together with the lens holding member in a direction away from the substrate, wherein the first screw-fastening portion and the second screw-fastening portion are movable from a first position that are not in contact with each other to a second position that are in contact with each other when being pressed by a biasing force of the biasing member.

2. The imaging device of claim 1, wherein the pressing member is rotatable with respect to the base member to change a distance between the lens of the lens holding member and an imaging surface of the imaging element.

3. An imaging device comprising:
a lens holding member holding at least one lens;
a base member holding the lens holding member;
a substrate, secured to the base member, that has an imaging element;
a screw-fastening member in contact with the base member, wherein the lens holding member is movable in a direction of an optical axis of the lens by rotating the screw-fastening member with respect to the base member;
a biasing member configured to bias the lens holding member away from the substrate,
wherein the lens holding member is biased in a direction away from the substrate
wherein the screw-fastening member includes a first screw-fastening portion of the lens holding member,
wherein the base member has a second screw-fastening portion,
wherein the first screw-fastening portion and the second screw-fastening portion are movable from a first position that are not in contact with each other to a second position that are in contact with each other when being pressed by a biasing force of the biasing member.

4. The imaging device of claim 3, wherein the lens holding member is rotatable with respect to the base member to change a distance between the lens of the lens holding member and the imaging surface of the imaging element.

* * * * *